(12) United States Patent
von und zu Liechtenstein

(10) Patent No.: US 12,105,867 B2
(45) Date of Patent: Oct. 1, 2024

(54) APPARATUS UND METHOD FOR RENDERING A VIRTUAL MONITOR ON SMART OPHTHALMIC DEVICES IN AUGMENTED REALITY ENVIRONMENTS

(71) Applicant: Maximilian Ralph Peter von und zu Liechtenstein, Hinterforst (CH)

(72) Inventor: Maximilian Ralph Peter von und zu Liechtenstein, Hinterforst (CH)

( * ) Notice: Subject to any disclaimer, the term of this patent is extended or adjusted under 35 U.S.C. 154(b) by 0 days.

(21) Appl. No.: 16/297,775

(22) Filed: Mar. 11, 2019

(65) Prior Publication Data

US 2021/0072821 A1 Mar. 11, 2021
US 2024/0077939 A9 Mar. 7, 2024

Related U.S. Application Data

(63) Continuation of application No. 15/670,615, filed on Aug. 7, 2017, now Pat. No. 10,228,566, which is a continuation-in-part of application No. 15/134,398, filed on Apr. 21, 2016, now Pat. No. 9,726,896.

(51) Int. Cl.

| G06F 3/01 | (2006.01) |
|---|---|
| G02C 7/04 | (2006.01) |
| G02C 7/08 | (2006.01) |
| G06T 19/00 | (2011.01) |

(52) U.S. Cl.
CPC ............. G06F 3/012 (2013.01); G02C 7/04 (2013.01); G02C 7/083 (2013.01); G06T 19/006 (2013.01)

(58) Field of Classification Search
CPC ............. G06F 3/011–013; G02C 7/04; G02C 7/083; G02C 7/085; G02C 7/086; G02C 11/10; G02B 27/01; G02B 27/0101; G02B 27/0149; G02B 27/017; G02B 27/0172; G02B 27/0176; G02B 27/0179; G02B 27/30; G02B 2027/014; G02B 2027/0138; G02B 2027/0134; G02B 2027/0132; G02B 2027/0141
USPC ........... 359/13–14, 629–633; 348/42, 51–60; 349/15
See application file for complete search history.

(56) References Cited

U.S. PATENT DOCUMENTS

| 10,962,795 B1* | 3/2021 | Gollier | G09G 3/001 |
|---|---|---|---|
| 2014/0085282 A1* | 3/2014 | Luebke | G06F 3/147 |
| | | | 345/207 |

(Continued)

*Primary Examiner* — Travis S Fissel

(57) ABSTRACT

An apparatus and a method are described herein related to the art of augmented reality type monitor virtualization. A monitor-virtualization system, such as a head-mountable device, an ophthalmic device or an intraocular implant, can render a virtual monitor in augmented reality. A liquid lens or an optical phased array can position the virtual monitor in space by optical means. A dimmable occlusion matrix can be additionally operated such as to make the image of the virtual monitor substantially opaque. A coordinator module can synchronize the activities of monitor positioning and occlusion masking. The virtual monitor can be anchored to real-world artifacts using bokode technology. Various dimming modes of the occlusion matrix reduce operator fatigue. The apparatus may operate in smart sunglass mode when the virtual monitor function is paused. The virtual monitor can be hidden or visualized differently when thresholds in terms of user geolocation or viewing angle are breached.

12 Claims, 31 Drawing Sheets

(56) References Cited

U.S. PATENT DOCUMENTS

2017/0336641 A1* 11/2017 Von und zu Liechtenstein .......... G06T 19/006
2020/0081252 A1* 3/2020 Jamali .................. G02B 5/1828

* cited by examiner

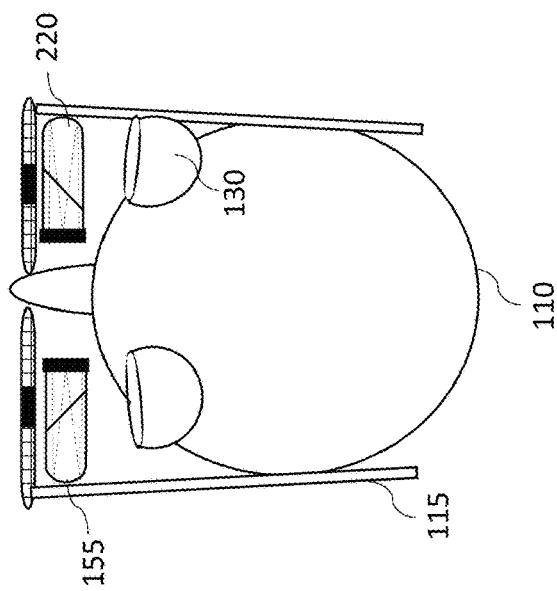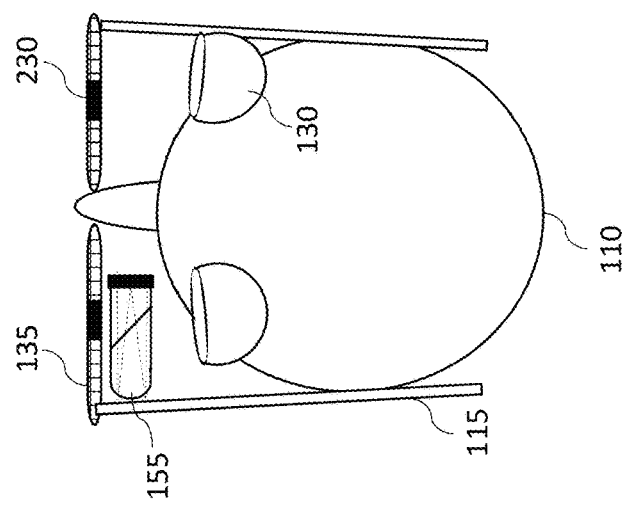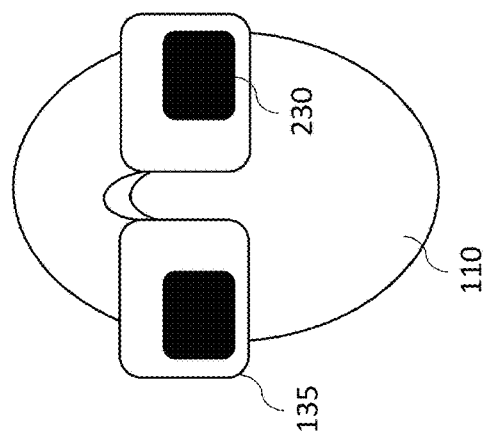
Figure 2

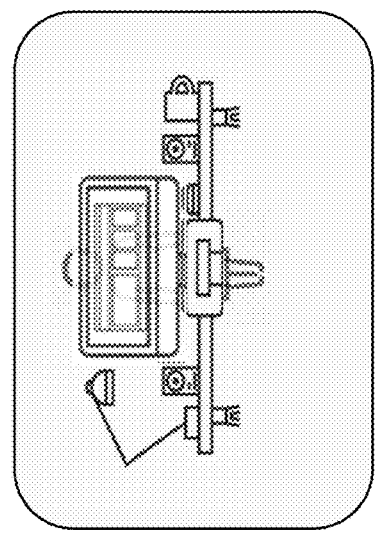
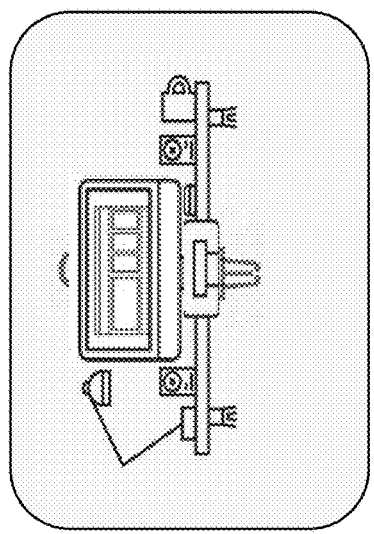
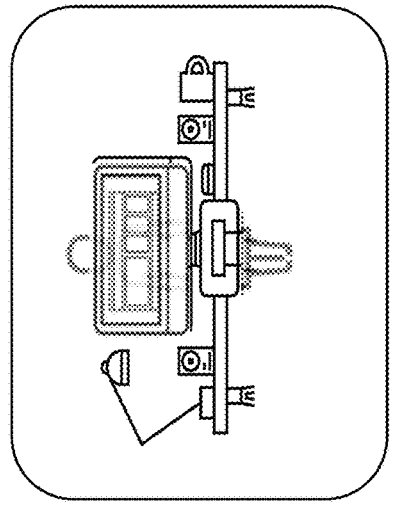
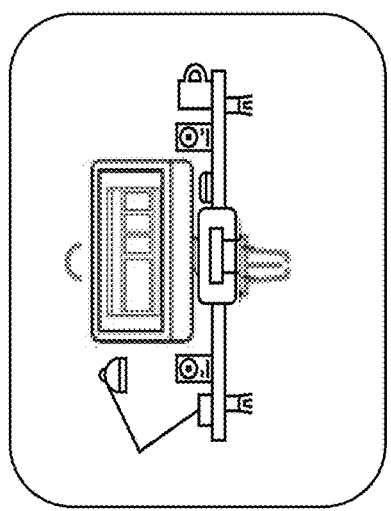
Figure 6A

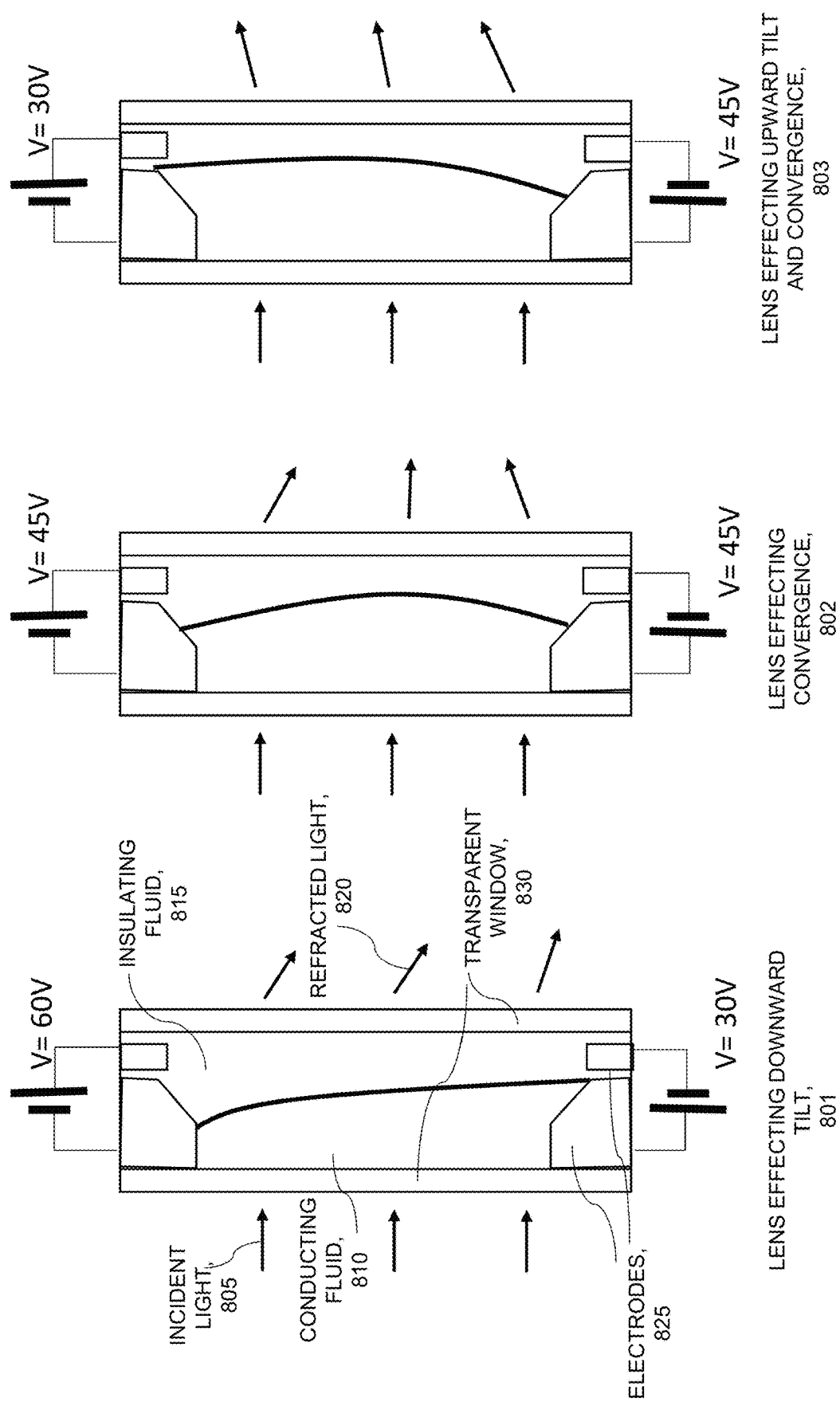

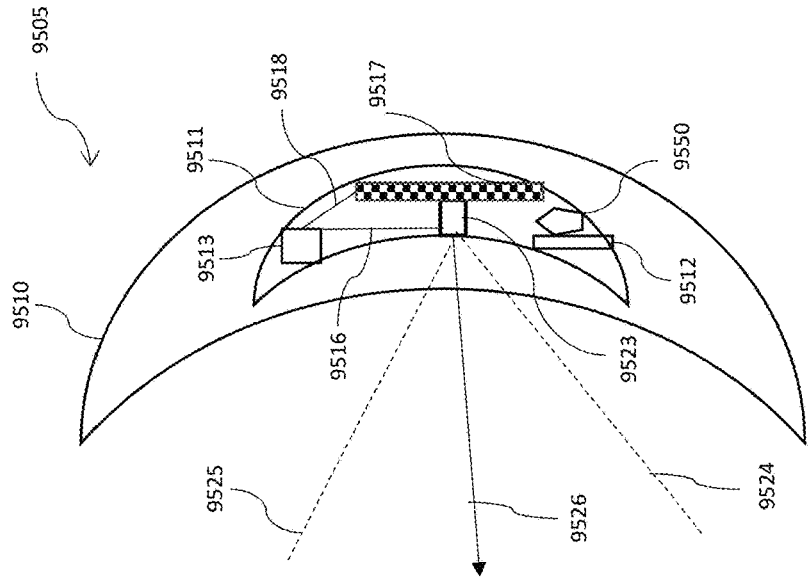
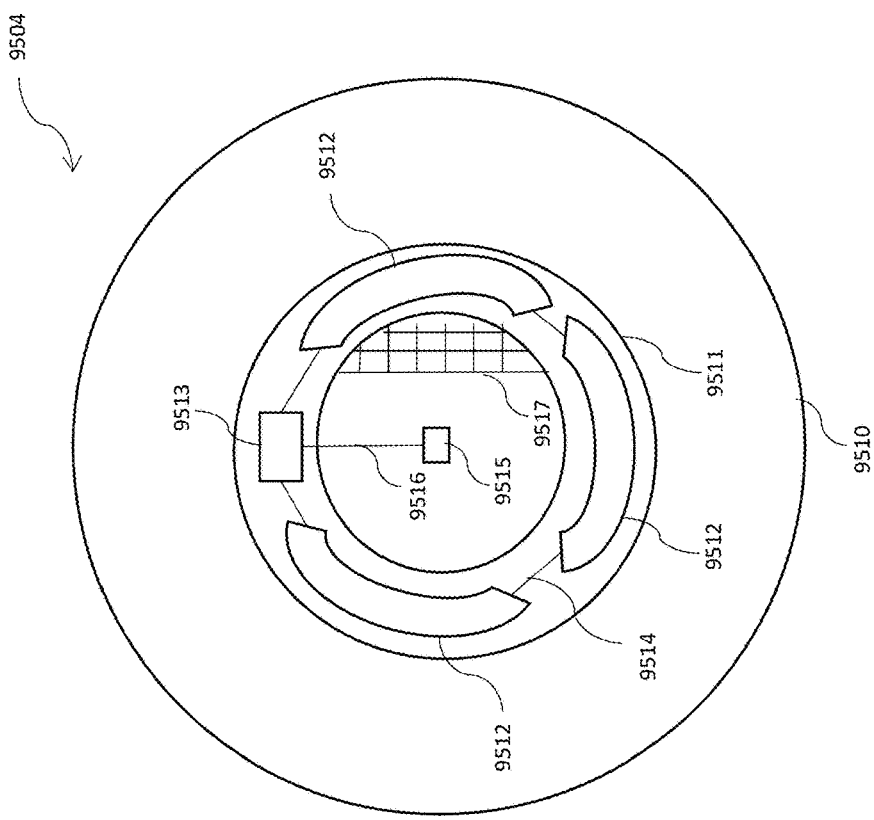
Figure 9E

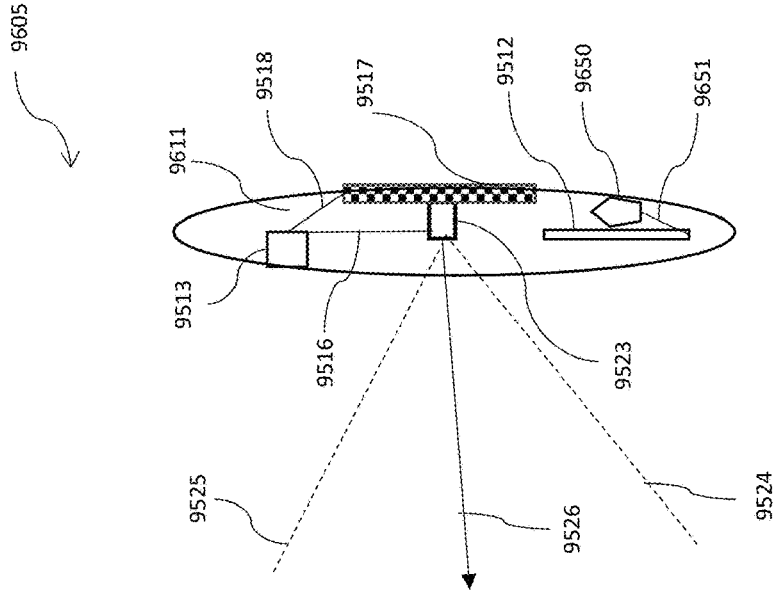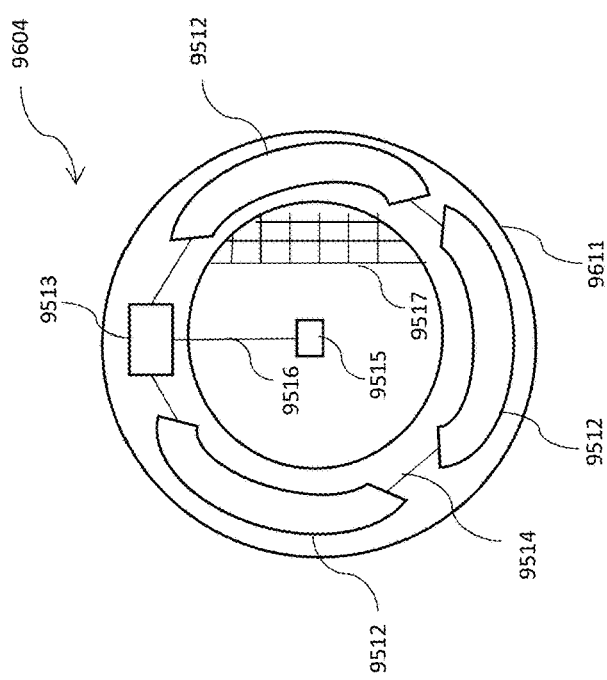
Figure 9F

US 12,105,867 B2

APPARATUS UND METHOD FOR RENDERING A VIRTUAL MONITOR ON SMART OPHTHALMIC DEVICES IN AUGMENTED REALITY ENVIRONMENTS

CROSS REFERENCE TO RELATED APPLICATIONS

This application is a continuation of the following U.S. patent application, which is incorporated by reference in its entirety:
U.S. Non-Provisional application Ser. No. U.S. Ser. No. 15/670,615, filed Aug. 7, 2017;
which is a continuation-in-part of the following U.S. patent application:
U.S. Non-Provisional application Ser. No. U.S. Ser. No. 15/134,398, filed Apr. 21, 2016;

STATEMENT REGARDING FEDERALLY SPONSORED RESEARCH OR DEVELOPMENT

Not applicable to this application.

BACKGROUND

Field

Example embodiments relate to apparatus and methods for displaying a simulated computer monitor or virtual desktop in an augmented reality environment comprising the use of a see-through head-mountable device, a smart contact lens or an implantable smart intraocular device.

Prior Art

Any discussion of the related art throughout the specification should in no way be considered as an admission that such related art is widely known or forms part of common general knowledge in the field.
When working with computers in an office or home setting the trend over recent decades has been to increase miniaturization and portability. The only parts of computer equipment which have not been subject to this process were those where ergonomical considerations have prevented further miniaturization. Screens and keyboards are a prime example of equipment where miniaturization is generally considered counterproductive in terms of usability. Whilst a bigger screen yields a better user experience on the whole, it also comes at a price in terms of placing significant space demands on an office desk and in reduced portability due to its weight and dimensions. Furthermore, scaling up the size of a screen comes along with a corresponding increase in cost. There have been attempts to virtualize a computer screen in the prior art, but the present state of the art does not offer a monitor virtualization system capable of satisfying enterprise requirements in an office environment.
With the advent of augmented reality and virtual reality technology a considerable number of contributions to improved display devices have been made in recent years. In particular there have been a considerable number of approaches attempting to superimpose a computer display onto a real-world image. Presently there are two separate avenues which have been demonstrated on the consumer market. On the one hand there exists the Virtual Desktop (developed and published by Guy Gordin), which is an application developed for the Oculus Rift and HTC Vive that lets the user interface their computer in virtual reality. On the other hand, there are a host of see through augmented reality devices, such as Google Glass, which feature virtual display overlaid onto the real-world. Generally any overlaid screens are subject to ghosting, meaning that these displays are see-through in such a way that the user can still see the real world behind a display. The augmented reality displays also render screen overlays generally in a way that does not take into account changes in the attitude of the user's head or the user's location. In most instances the relative position and focal distance of such displays are pre-set and cannot be changed by the user. Very often the disparity between focus depth and vergence which typically besets such devices makes the user experience unsatisfactory, especially if the screen displays are viewed for prolonged times.
US patent application publication US20160379417 A1 by Mount et al. published on Dec. 29, 2016 discloses a virtual monitor that appears to be integrated with the physical space to a user viewing the physical space through the see-through display.

SUMMARY

The present invention recognizes that it is desirable to move from computer screens realized as hardware components to screens virtualized in an augmented reality environment. The main challenge that the present invention aims to overcome is how to provide the user with a virtualized screen that has at least the same, or ideally an even better level of usability compared to a conventional computer monitor realized as a hardware component.
The present inventor considers it desirable to separate the input devices from the display device in such a way that a conventional notebook computer, for example, would no longer comprise an inbuilt screen, but that the screen ought to be virtualized in augmented reality. A preferred embodiment of the present invention therefore is a notebook-type computer device whereby the screen or monitor is virtualized by a see-through head mountable device.
A major advantage of screen virtualization is increased privacy. It thus becomes possible for the user of a notebook-type computer device to view private or confidential material in a crowded place without any danger of compromising privacy, since only the wearer of the head mountable device is able to view the screen. Due to the restricted usability of the known prior art solutions, no system is presently known which combines the usability of a notebook computer with the privacy benefits that only a retinal projection display, such as found on see through head mountable devices, can deliver.
A further disadvantage of a large physical monitor is that it occludes the field of view of the user to a significant extent, even at a time when the monitor is either not in use, or not being actively used. Embodiments of the present invention therefore automatically hide the monitor, or alternatively increase transparency of the image of the virtual monitor, in such situations. An example in an office setting would be an open plan office space where co-workers face each other across their desks. Assuming that each office worker had a very large conventional computer monitor in front of them, it would significant restrict opportunity for social interaction across a desk since each user is practically shielded from such interaction by the size of their computer monitors. This is different, however, when certain embodiments of the present invention are utilized. When using a virtualized monitor with full occlusion support in a preferred embodiment of the present invention, there is no significant difference to a hardware monitor as long as the user looks straight at the monitor. If, however, the user glances up or looks around the office, the display can be configured so that it auto-hides in such situations. The virtualized monitor therefore disappears from view altogether and what was occluded previously by the monitor now becomes visible. The user can now enjoy an unobstructed view of their office. The same could be configured to happen, if the user got up and moved around the office, while still wearing the head-mountable device. The system would detect that the user has gotten up from their seat and as a result auto-hide the computer display, if so configured.

In order for the various embodiments of the present invention to be able to match the usability of a conventional hardware monitor a number of limitations exhibited by current state of the art devices had to be overcome. Presently users can choose primarily between two types of head mountable display devices, namely virtual reality head mountable devices (such as Oculus Rift for example) and augmented reality head mountable devices (such as Google Glass for example). Generally virtual reality head mountable devices are capable of rendering a high-quality video display, however the fact that they are very bulky and completely shield the user from any form of meaningful interaction with people in the real world rules them out for prolonged everyday use in a typical office environment. Lightweight augmented reality head mountable devices on the other hand would pass the test for user acceptance in such an environment. However, prior art see-through head mountable devices tend not to be optimized for computer monitor virtualization and as such the quality of the display is not sufficient to allow such devices to be serious contenders for replacing hardware monitors in a professional setting. The problems which have to be overcome are manifold.

Firstly, most commonly available lightweight see-through augmented reality headsets do not offer occlusion support. Therefore, any displayed screen is necessary half-transparent, a problem known as "ghosting", which would render any such display unsuitable for professional use as a monitor replacement. Embodiments of the present invention are shown which can overcome ghosting by using an occlusion matrix made from an array of individually dimmable cells.

The present inventor has realized that in order to be able to provide maximum resolution of an augmented reality (AR) virtual monitor it is advantageous to adjust the relative position of the virtual screen AR object exclusively by optical means as opposed to simulating such a repositioning move via the pixel matrix of the associated micro display thus preserving maximum resolution and avoiding undesirable pixilation of the target image.

The present inventor has also realized that is can be advantageous to not only occlude the virtual image. Instead there are embodiments shown wherein the virtual image is slightly transparent in order to allow a user of the virtual monitor to remain aware of the real world behind the monitor. There are also embodiments where the area in the field of view not subject to occluded augmented reality artifacts is dimmed in order to provide better contrast for viewing the augmented reality artifacts. Moreover, there are embodiments wherein the virtual monitor apparatus can be used as smart sunglasses whenever the virtual monitor is not in use. Smart sunglasses in this context are understood to be sunglasses whereby the lenses can be dimmed by electronic means and wherein the dimming may equally be applied to the entire lens area, or to individually controllable dimmable cells which make up the lens.

Almost all commonly available head mountable see-through augmented reality devices present the image at a fixed single distant focal plane, which means that unlike the real world, the brain cannot sense any depth information from the focus of the lens in the eyes. Instead the brain gets depth cues from the images by measuring how much the eyes have to rotate toward each other to look at an object, an effect known as "vergence". Head-mountable augmented reality devices can cause nausea in a user, so called "simulator sickness", if the vergence distance differs from the focus distance. In order to ensure that virtualized computer monitors, such as disclosed in various embodiments of the present invention, do minimize user discomfort, a varifocal display comprising the use of liquid lens or optical phased array technology is employed. Using this technology, the user is capable of setting the focal distance of the virtualized monitor to a desired value. An embodiment of the present invention uses a monocular display coupled with binocular occlusion. This is another measure not known in the prior art to reduce simulator sickness, whilst at the same time making the head mountable device less complex, less bulky and less weighty.

A further advantage of using liquid lens or optical phased array technology in the preferred embodiments is that in addition to being able to refocus at variable focal distances the virtual image can also be offset in any direction, such as moving the virtualized monitor up or down and left or right.

This disclosure provides, in part, a monitor virtualization apparatus for displaying a virtual monitor, wherein the apparatus can take the form of a head-mountable device, a smart contact lens or an implantable intraocular device.

This disclosure also provides, in part, a method for enabling a user of a monitor virtualization system, such as a head-mountable device, a smart contact lens or an implantable smart intraocular device, to be presented with a virtualized display screen. Some embodiments are capable of positioning within a field of view a retinally projected augmented reality type virtual monitor primarily with optical means only, using dynamic lenses, i.e. either liquid lenses or optical phased array type virtual lenses. Said optical positioning is configured in such a way that any vergence-accommodation conflict is substantially eliminated. Some embodiments combine positioning of the virtual monitor with occlusion masking, wherein the occlusion masking is achieved by an array of dimmable pixels placed in the line of sight. These embodiments may comprise a coordinator module which synchronizes the dynamic lens controller with the occlusion matrix controller. In some embodiments, said dynamic lens and occlusion matrix combination is realized with the context of a head mountable device, in other embodiments said combination is utilized in the context of a smart contact lens or a smart intraocular implant. In some embodiments, the occlusion matrix may be configured for dual purpose operation, as either a virtual monitor occluder or as smart sunglasses, where the lenses may adjust their light-filtering properties on a pixel-by-pixel basis. In some embodiments, occlusion of the virtual monitor may allow for residual transparency in order for the user to remain aware of the real-world behind the virtual monitor. In some embodiments, non-occluding pixels of the occlusion matrix may be dimmed in order to allow better readability of the virtual monitor in strong ambient lighting conditions. In some embodiments, the virtual monitor may be anchored to real-world artifact by using bokode beacon technology. In some embodiments, the virtual monitor may auto-hide, or be subject to other changes in appearance, following changes in geo-location of the viewer or in response to changes of the viewing angle. In some embodiments, the virtual monitor may be controlled by voice command even in extremely noisy environments, wherein a head-mountable device comprises a plurality of bone conducting transducers, wherein the transducers extract useful data for phoneme disambiguation in the context of the voice command interpretation engine.

There has thus been outlined, rather broadly, some of the features of the virtual monitor apparatus and method in order that the detailed description thereof may be better understood, and in order that the present contribution to the art may be better appreciated. There are additional features of the virtual monitor apparatus and method that will be described hereinafter and that will form the subject matter of the claims appended hereto. In this respect, before explaining at least one embodiment of the virtual monitor apparatus and method in detail, it is to be understood that the virtual monitor rendering technique is not limited in its application to the details of construction or to the arrangements of the components set forth in the following description or illustrated in the drawings. The virtual monitor rendering technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 2 is a schematic diagram giving a top view and a frontal view of an exemplary embodiment of a head mountable device being operated by a human user setting in accordance with the principles of the present invention. Both the monocular and the binocular embodiments are depicted.

FIG. 6A is an illustration giving an overview of various dimming modes of a preferred embodiment setting in accordance with the principles of the present invention.

FIG. 8 illustrates an exemplary embodiment with focus on the liquid lens components and their operation.

FIG. 9E illustrates an exemplary embodiment of a smart contact lens comprising a virtual monitor retinal projection system.

FIG. 9F illustrates an exemplary embodiment of an implantable intraocular device comprising a virtual monitor retinal projection system.

DETAILED DESCRIPTION

Among the display screens known in the prior art are both hardware realized screens, such as the computer monitors integrated with a common notebook computer and virtualized screens, such as those integrated with common head mountable devices of which Google Glass would be an example. Common hardware realized monitors are cumbersome in that they are bulky, weighty and view-obstructing when not in use. Moreover, conventional hardware realized monitors are generally targeted for just one single user per session and therefore the fact that it is easy for other people to look over the user's shoulder and observe the screen is deemed a disadvantage in terms of privacy. Conventional hardware realized monitors may be scaled up to almost any size, however the disadvantages mentioned hereinabove as well as the cost of production will generally scale up in equal measure. Virtualized screens, as known in the prior art, are also beset with a host of problems. Most commonly the lightweight augmented reality designs suffer from problems with "ghosting" due to lack of occlusion and "simulator sickness" due to a mismatch between focal distance and vergence distance. The virtual reality designs on the other hand tend to require a very bulky eye box that completely shields the user from the surrounding environment making any meaningful interaction with other people in the real-world surroundings nearly impossible whilst the device is worn. The present inventor has discovered that by combining a number of components which are readily available on the present market, a lightweight, augmented-reality type monitor virtualization system can be created which minimizes the problems mentioned hereinabove to such an extent that the system is potentially capable of replacing a conventional computer monitor in a professional setting. Such a monitor virtualization system may take the form of a head mountable device, a smart contact lens or a smart intraocular device. In a preferred embodiment, the system takes the form of a smart sunglasses device which is also capable of virtualizing a monitor. The system which embodies the principles of the present invention not only has similar usability characteristics as a conventional monitor, it also has some unique advantages. It has remained for the present inventor to recognize that causing a virtual monitor to auto-hide depending on certain cues and parameters that a useful and novel function is provided to a user, namely that the available desk space becomes uncluttered due the absence of physical computer monitors and social interaction with the environment is therefore enhanced. This is particularly useful in an office environment where large physical computer monitors tend to block the line of sight around the office. Nevertheless, the user is shielded from distraction across their desk by the occlusion mask whilst working with the screen because the virtual monitor is perceived similarly opaque as a conventional monitor.

Figure 1:
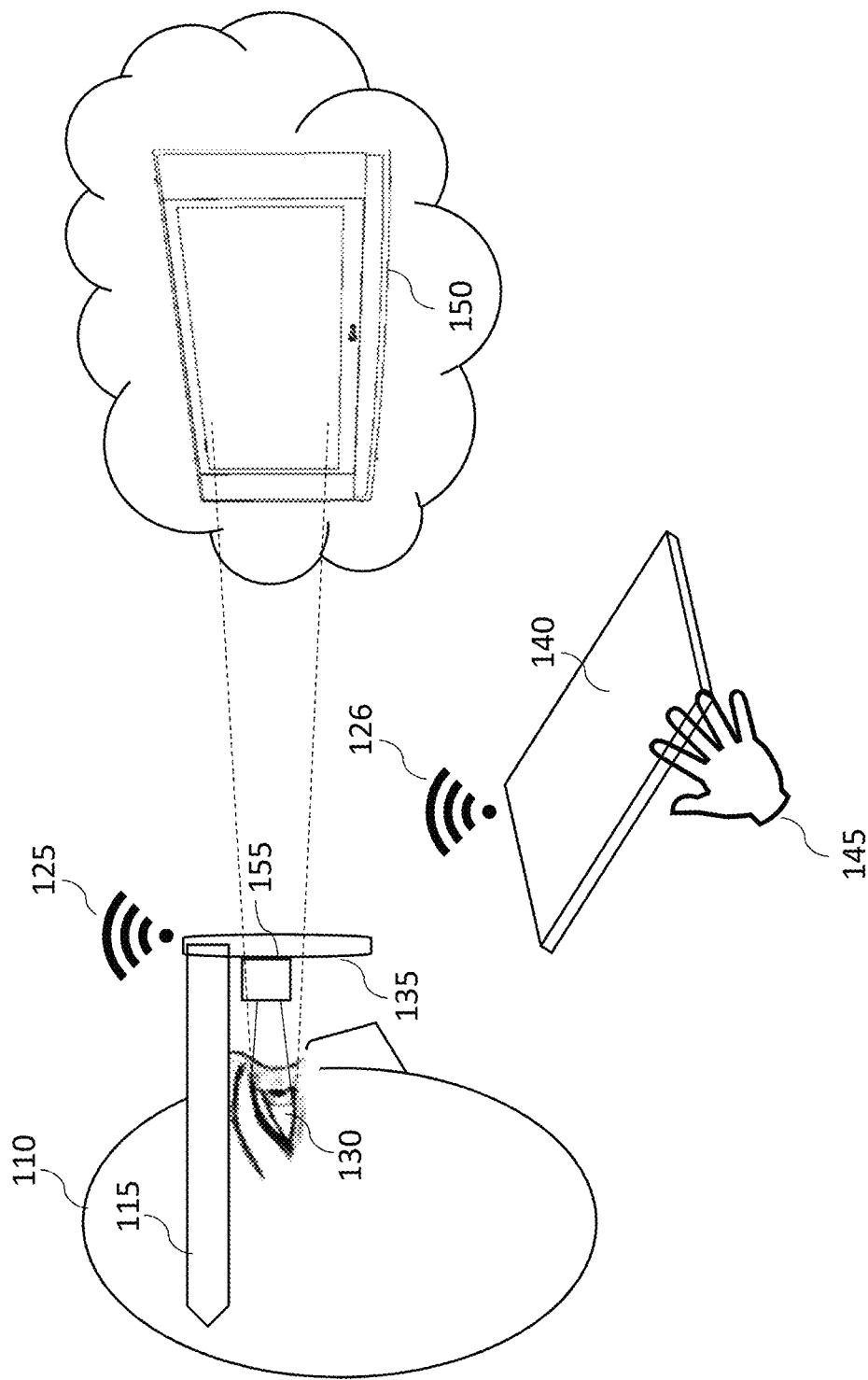
FIG. 1 is an overview diagram illustrating the concept of a virtualized screen in the context of a personal computer setting in accordance with the principles of the present invention.

FIG. 1 depicts a virtualized screen 150 embodying the principles of the invention. The screen can be any type of display screen, such as a conventional computer monitor or a television screen. The user 110 may with their hands 145 operate a touch-based input device 140, which may come in the form of a computer keyboard, a mouse, a touchpad, a television remote control or any other such input device. The user 110 is wearing a see-through head mountable device 115 which may comprise a wireless transceiver 125 which, in turn, may be coupled to a similar wireless transceiver 126 in an input device 140. The head mountable device 115 comprises occlusion matrixes 135 capable of rendering select portions opaque. The head mountable device 115 may also comprise a retinal projection display 155.

In FIG. 2 a frontal view 201 and two top views 202 203 of the user 110 wearing the head mountable device 115 are depicted. Both views relate to the same invention setting as shown in FIG. 1. The frontal view shows the occlusion masks 230 of the occlusion matrixes 135, whereby the occlusion masks relate to cells dynamically rendered opaque, or substantially opaque, in an occlusion matrix, such as may be realized with spatial light modulators or liquid crystal technology. The top views 202 and 203 in the figure represent two separate embodiments of the invention, namely a monocular retinal projection embodiment 202 and a binocular retinal 21 projection embodiment 203. Both embodiments may comprise a binocular occlusion matrix 135. The present inventor has realized that a monocular retinal projection embodiment coupled with a binocular occlusion matrix offers almost the same level of usability as the embodiment comprising binocular retinal projection whilst at the same time having the benefits of a much lighter and more open design of the head mountable device. Therefore, the encumbrance on the user is greatly reduced whilst only a modest reduction in usability has to be accepted as the tradeoff.

Figure 3:
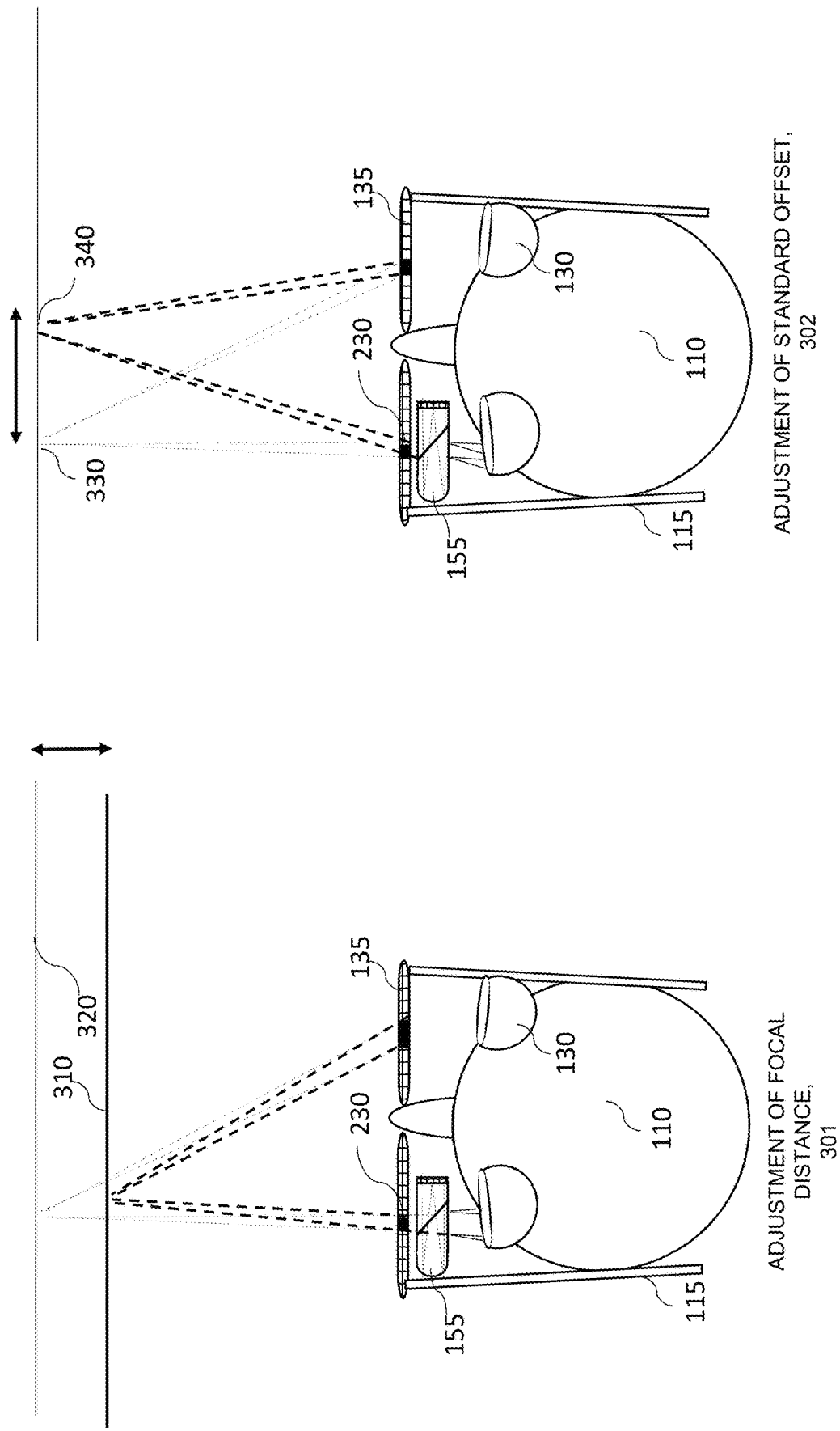
FIG. 3 is a schematic diagram illustrating the concept of adjustment of focal distance and virtual image offsets in accordance with the principles of the present invention.

In accordance with an advantageous feature of the invention, and as can be seen from FIG. 3 the head-mounted device 115 lets the user 110 adjust both the focal distance and the offset of the virtual screen. When the focal distance is altered this action is akin to moving a hardware realized monitor back 310 or forth 320 on a desk. This implies that the size of the virtual image of the virtualized screen is reduced in proportion to an increase in focal distance. Just like a real-world computer monitor the virtual display is fixed in absolute size and a change of focal distance will bring a change of relative size. Whenever the relative size of the virtual image changes due to a change in focal distance, the system depicted in the embodiment will also adjust the size of the corresponding occlusion mask 230.

It may be up to user preference where the virtual monitor is to be placed in the field of view 302. The default setting may be that the virtual monitor is placed in a central position in the field of view. The depicted system, however, allows the user to change the default and offset the position in any direction, i.e. left/right 330 340 and up/down. Whenever the offset is altered by the user, the corresponding occlusion masks have to be moved in a corresponding fashion, so that the occlusion matrix becomes substantially opaque in the line of sight of the virtual monitor.

Figure 4:
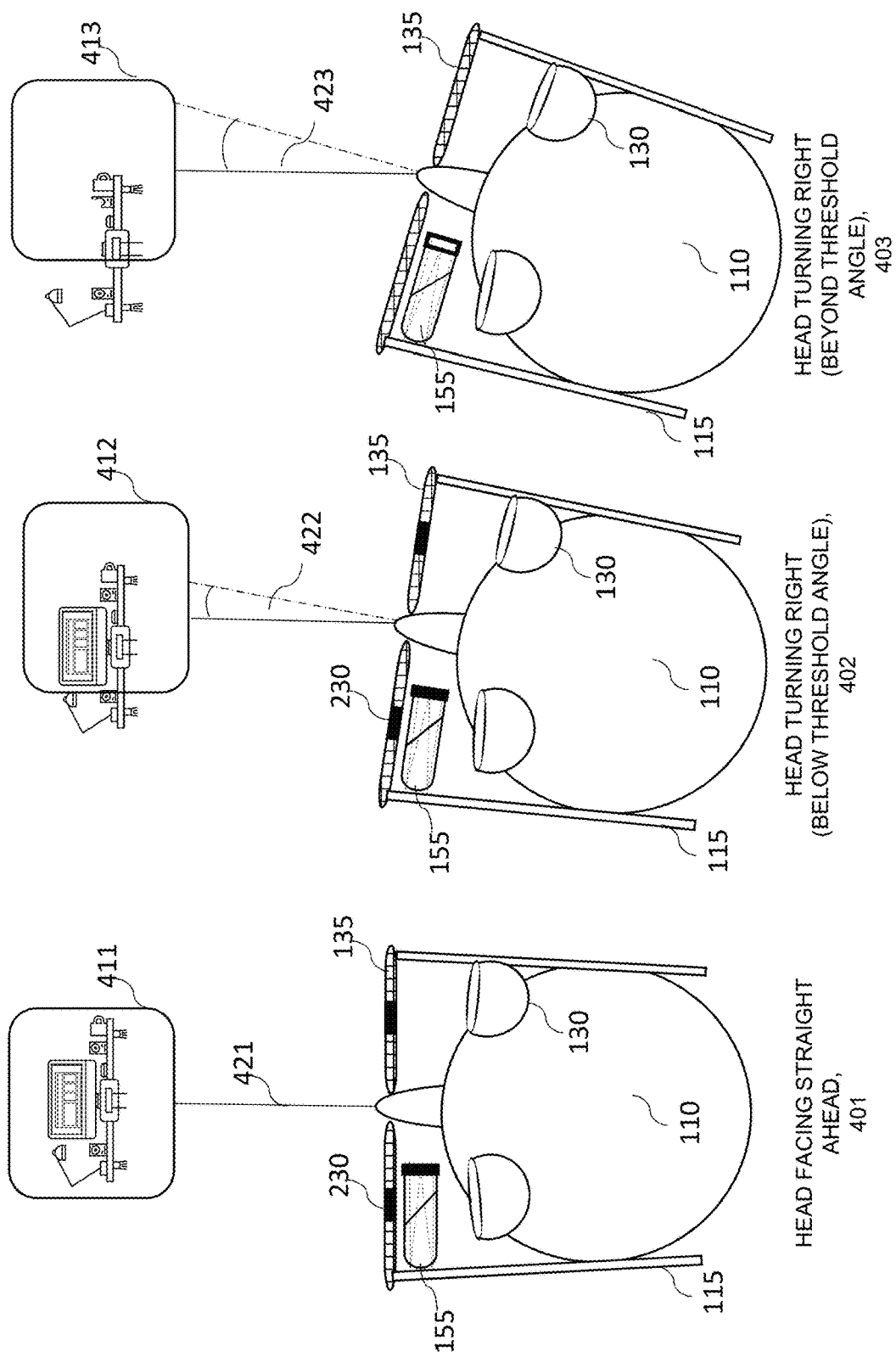
FIG. 4 is a schematic diagram illustrating the inventive concept of auto-hiding the virtual monitor once a pre-set head pan threshold angle has been exceeded setting in accordance with the principles of the present invention.

In accordance with an advantageous feature of the invention, and as can be seen from FIG. 4, turning the head sideways may have the effect of either moving the virtual image of the computer monitor or switching off the virtual image altogether, as well as clearing all occlusion masks. Which of these two possible actions is executed in response to a turning movement of the head may depend on the angle of the head movement. Once an angle which has been pre-set as a threshold parameter is exceeded, the display may be cleared of all augmented reality artifacts, thereby giving an unobstructed view of the real world. If the angle is subsequently reduced again, then the augmented reality artifacts, i.e. the virtualized monitor and the occlusion masks, may reappear once more. In FIG. 4 frames 411, 412 and 413 depict the field of view of the user which is changing in response the head-turning angles 421, 422 and 423 being increased. Inside the field of view frames there is a depiction of the augmented reality scene which the user will see.

Figure 5:
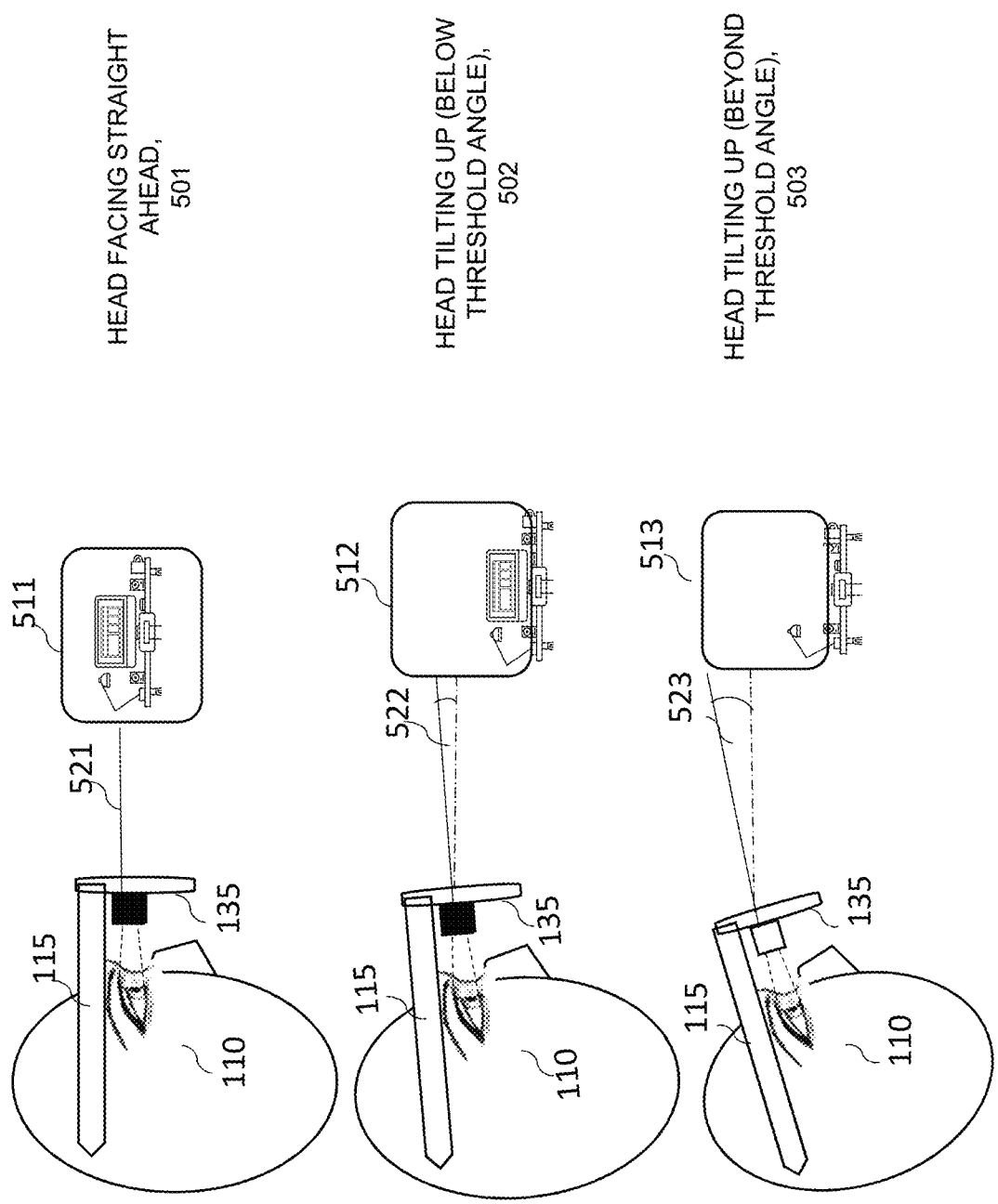
FIG. 5 is a schematic diagram illustrating the inventive concept of auto-hiding the virtual monitor once a pre-set head tilt threshold angle has been exceeded setting in accordance with the principles of the present invention.

In accordance with another illustrative feature of the invention, a preferred embodiment has a feature wherein a tilting motion of the user's head will either adjust the position of the virtual image or switch off augmented reality altogether, depending on the angle of the head tilting movement. FIG. 5 illustrates this concept for three different head tilt positions: no tilt angle 521, a tilt angle 522 below the threshold and a tilt angle 523 beyond the threshold. The field of view frames 511, 512 and 513 depict what the user would see through the head mountable device 115. Whilst the tilt angle 522 is below the threshold parameter for the auto-hide function both the virtual image and the associated occlusion mask are displayed. The position of the virtual image and the occlusion mask may be automatically adjusted, so that the augmented reality scene appears unchanged to the user. Only once the tilt angle 523 exceeds the threshold parameter the augmented reality artifacts may be deactivated, so that they are no longer visible. This is a particularly advantageous feature of the present invention, since it enables an office worker, for example, to communicate with a co-worker across a desk, without being encumbered by augmented reality artifacts for the duration of the social exchange. As soon as the user assumes a position within the threshold parameters once more, then the augmented reality virtual monitor is automatically restored and the user can resume working with the virtual screen.

The optics which were used when implementing various embodiments comprise the use of dynamic lenses, i.e. lenses which allow adjusting some or all of their optical properties, such as lens power, by electronic means. Some embodiments make use of liquid lenses or optical phased arrays in order to implement the required dynamic lenses. The present inventor has realized that a dynamic lens would not only solve the problem of projecting the virtual monitor at an arbitrary focal plane, but that a dynamic lens would also be able to both change the offset of the virtual screen and to move the virtual screen in response to head movements of the user in such a way that the virtual screen appears to stay in the same place when the user makes voluntary or involuntary head movements. A further contribution of the present inventor to the prior art optical setup was the combination of a dynamic lens and an occlusion matrix to the setup in order to prevent ghosting.

Figure 6:
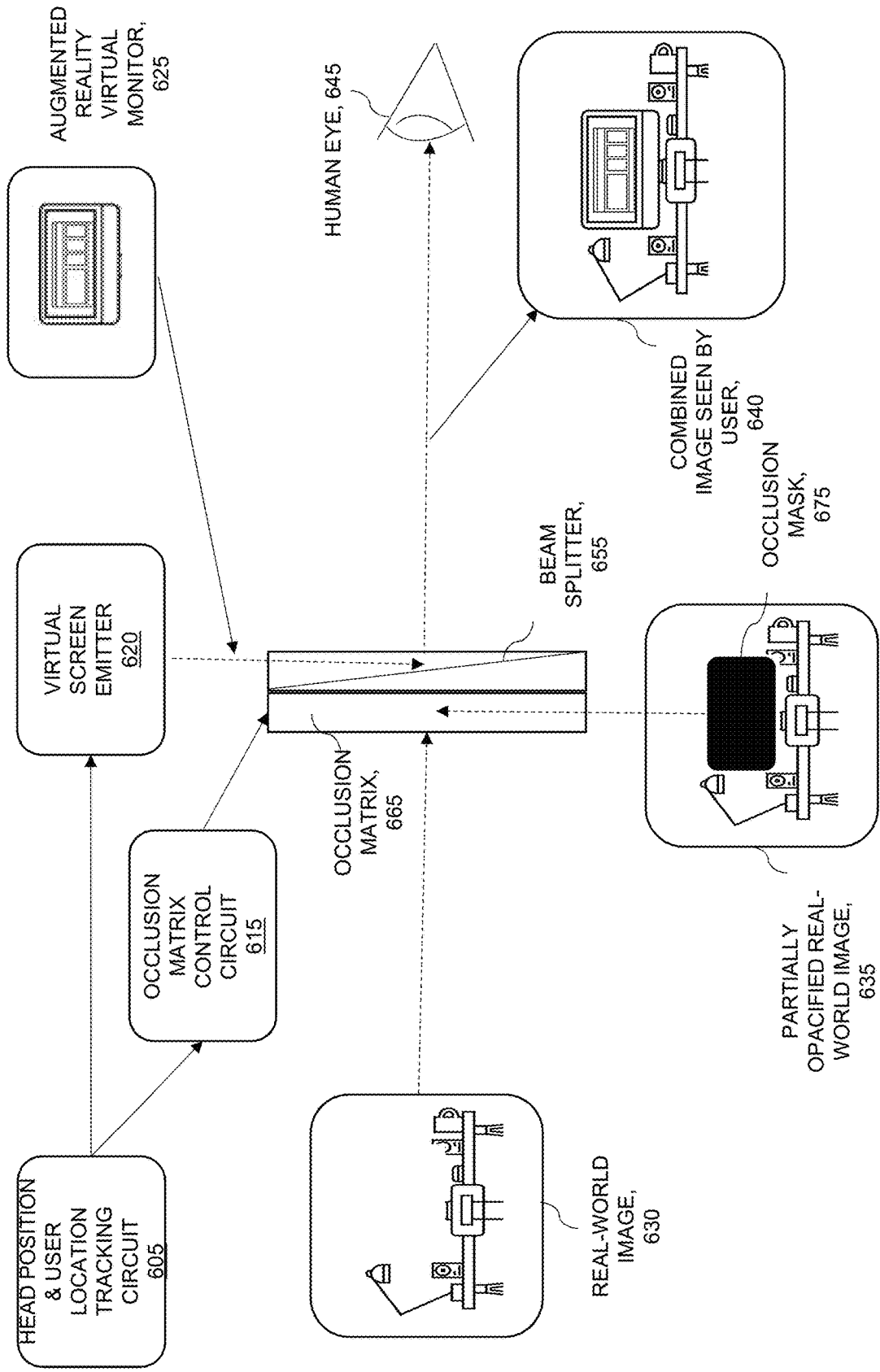
FIG. 6 is a schematic diagram giving an overview of the high-level system architecture setting in accordance with the principles of the present invention.

FIG. 6 is a high-level block diagram exemplifying the interaction between the various main components making up the depicted embodiment of the invention. A real-world image passes through the occlusion matrix 665 wherein an occlusion mask 675 may cause a section of the eyeglasses of the head mountable device to become either opaque or substantially dimmed. The occlusion matrix 665 itself may be controlled by a control circuit 615, which in turn may take control input from a head position and/or user location tracking circuit 605. The control input from tracking circuit 605 may cause the occlusion control circuit 615 to shift or to auto-hide the occlusion mask in accordance with a motion of the user. The tracking circuit 605 may also provide control input to a virtual screen emitter 620. The exemplary virtual screen emitter 620 is responsible for generating the image of the virtual screen and for placing it at the correct focal distance and/or at the correct offset position. The virtual screen emitter 620 may comprise a micro display and means to vary the focal distance and offset, realized by a liquid lens in the preferred embodiment. The virtual screen emitter may also be realized without a micro display and without a liquid lens in an alternate embodiment. Said alternate embodiment may use an optical phased array, which may be capable of simultaneously fulfilling both the functions of image emitter and virtual lens. The partially opacified real-world image 635 may be combined with the image of the micro display 625 by a beam splitter 655 within the context of the liquid lens embodiment. The combined image 640 may subsequently be projected towards the retina 645 of a user.

FIG. 6A depicts various alternative modes of operating the occlusion matrix. 6110 illustrates a fully opaque and undimmed mode. Here the occluding pixels of the occlusion matrix are set to fully opaque and hence no, or only very minimal, light from the real world is transmitted through the occluding pixels. The non-occluding pixels may be set to fully transparent mode and which implies that they let through as much light from the real world as is possible. The minimally transparent and undimmed mode 6120 is characterized by configuring the occluding pixels to let through a small amount of light from the real world, normally between 10 and 30 percent transmittance, and exactly 10 percent in a preferred embodiment; whereas the non-occluding pixels are set for maximum transmittance. The main benefit of this mode is that the user can stay alert of their surroundings whilst working with the virtual monitor. The fully opaque and dimmed mode 6130 represents a preferred embodiment. In this mode the user benefits from minimal transmittance of the occluding pixels, whilst at the same time being able to work with the virtual monitor in bright or very bright ambient lighting conditions. This becomes possible by selectively attenuating the incident light from the real world which is hitting the non-occluding pixels. The minimally transparent dimmed mode 6140 combines attenuation of non-occluding pixels with a small degree of transmittance with respect of the occluding pixels. This mode is particularly suitable for working in bright ambient lighting conditions when it is also necessary for the user to keep track of movements in the real world whilst working with the virtual monitor.

Figure 6B:
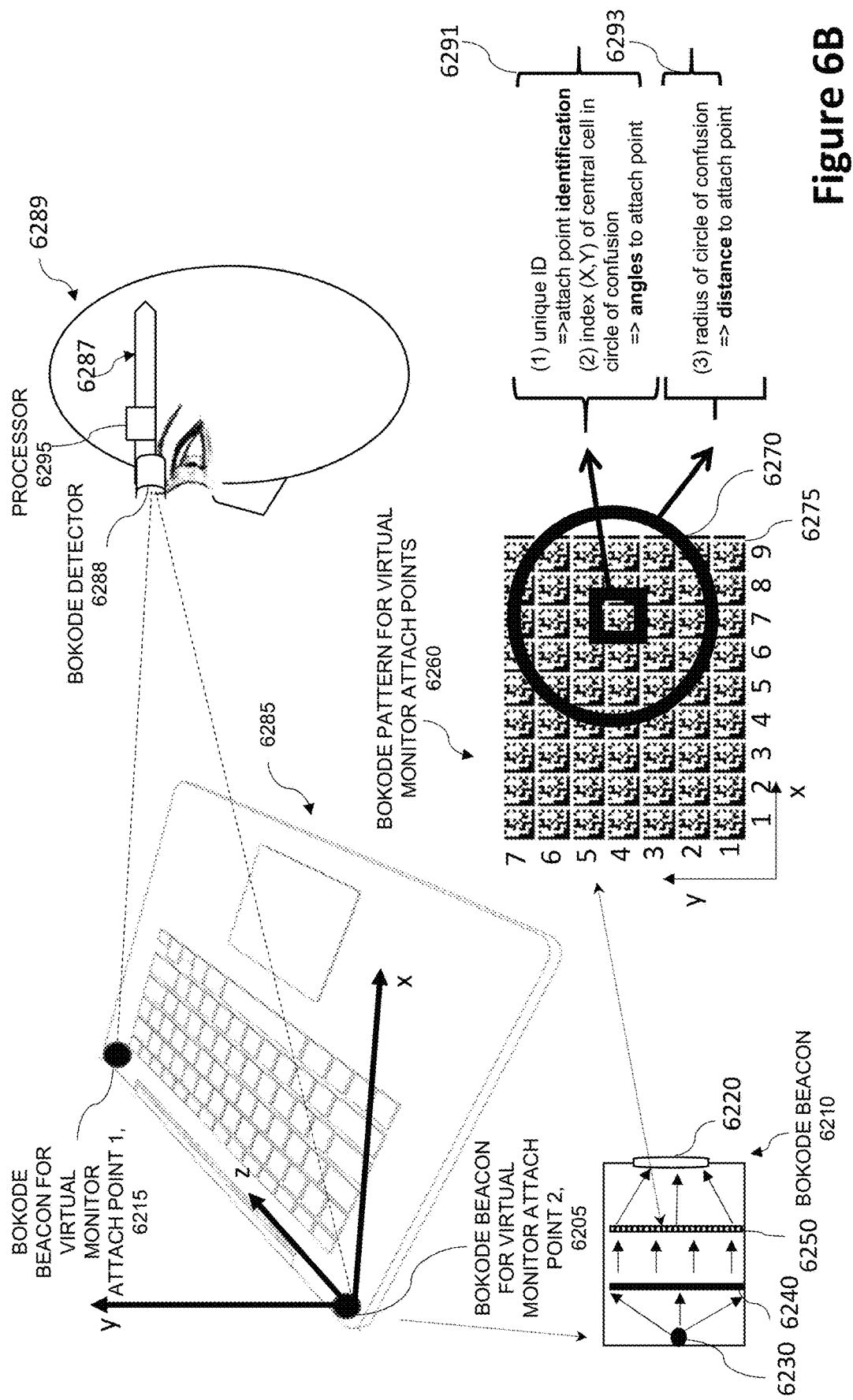
FIG. 6B is a schematic diagram illustrating the use of bokode beacons as virtual monitor attachment points setting in accordance with the principles of the present invention.

FIG. 6B depicts a method for optionally anchoring the virtual monitor to a fixed position in space. Specifically, the virtual monitor may be anchored to a computing device, such as a notebook computer, a desktop computer or a tablet computer. Anchor points on any other real-world object or artifact are also possible. This mode of operation allows an accurate simulation of a traditional hardware monitor. For this simulation to be possible a longstanding problem in the art has to be solved, which is that of anchor point recognition. It is necessary to be able to determine the position of at least two anchor points in relation to the reference frame of the head mounted device 6287 worn by a user of a virtual monitor 6289. A preferred embodiment uses a bokode detector 6288 mounted on the frame of a head mountable device 6287. A bokode detector may be realized with different types of digital camera, a lenslet-type camera in a preferred embodiment and a flat lensless phase array camera in an alternative embodiment. Other types of camera are also possible. The designated anchor points for the virtual monitor may be indicated by bokode beacons 6205 and 6215. In the example of FIG. 6B, anchor point beacons are sunk into the frame of a notebook-type computer 6285. Using bokode technology, each anchor point may allow a bokode detector 6288 to determine the identity of an individual anchor point, in addition to the distance to the anchor point and the angle between said detector and the anchor point. Anchor points 6205 and 6215 are realized by bokode beacon 6210, which may comprise a light-emitting diode 6230, a diffuser 6240, a bokode pattern 6250 and a lenslet 6220. Those skilled in the art will realize that the bokode beacon may also be realized with other components than those depicted. The bokode pattern 6260 may be realized as an array of tiled datamatrix codes. Other bokode patterns are also possible. Those skilled in the art will realize that other type of barcodes, or indeed any other type of machine-readable codes can be used. Each array element may encode a unique id for the anchor point and an array index of the array element. When user 6289 looks at computing device 6285, then the bokode detector 6288 only sees the part of the bokode pattern 6260 which is delimited by the circle of confusion 6270. The headset 6287 may be equipped with just a single bokode detector, mounted in a central position near the nose bridge of the headset in a preferred embodiment. Alternatively, a plurality of bokode detectors may be used, for example where a bokode detector is attached near each eye of the user 6289. Other locations for mounting the bokode detector are also possible. Processor 6295 may subsequently analyze the image data captured by the bokode detector 6288. By determining the center of the circle of confusion 6270 the individual datamatrix array element can be identified which intersects the central point of said circle of confusion. From that central array element, the processor may extract the information contained in the datamatrix element. The information that can be gained from that read operation 6291 comprises the unique identification code of the bokode beacon. That identifier will normally be identical for all elements in bokode pattern 6260. What is unique for an individual array element is the array index, which is also encoded in the datamatrix element. Those skilled in the art will realize that once the datamatrix element at the center of circle of confusion has been identified, the angles can be calculated which define the angular offset of the bokode beacon in relation to a looking straight ahead direction in relation to each of the entrance pupils of the eyes of the user 6289. Processor 6288 also determines the radius of the circle of confusion 6270. The radius of the circle of confusion is proportional to the distance between the bokode detector 6288 and the bokode beacon 6210. Those skilled in the art will realize that the distance from the headset 6287 to the bokode beacon can hence be reliably estimated from the radius of the circle of confusion.

Figure 6C:
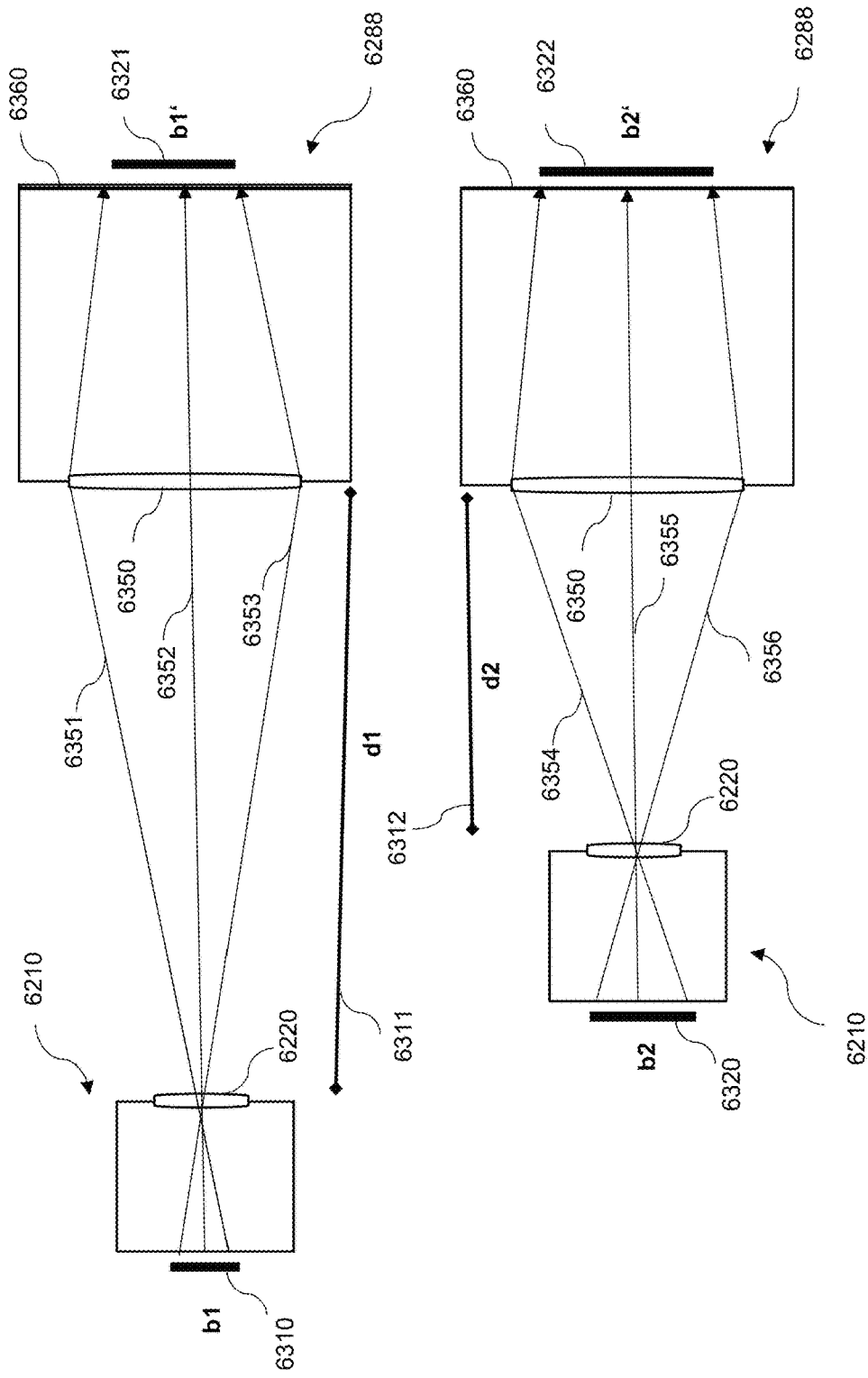
FIG. 6C is a ray diagram illustrating the lateral displacement of a bokode beacon against a bokode detector setting in accordance with the principles of the present invention.

FIG. 6C shows a ray diagram which illustrates how the diameter of the image of the circle of confusion on the bokode detector is affected by the distance to the bokode beacon. In the figure, the distance between the bokode beacon 6210 and the bokode detector 6288 is reduced from distance d1 6311 to distance d2 6312. Rays 6351, 6352 and 6353 exemplify the light path of the image making up the circle of confusion through lenses 6220 and 6350. As can be seen from the ray diagrams, the diameter b1 6310 of the circle of confusion is proportional to the diameter of the image b1' 6321 of the said circle of confusion, whereby the diameter b1' is a function of the distance between bokode beacon and bokode detector. In the example depicted, at distance d2 circle of confusion b2 6320 has a larger diameter than the corresponding diameter b1 6310 at distance d1 6311.

Figure 6D:
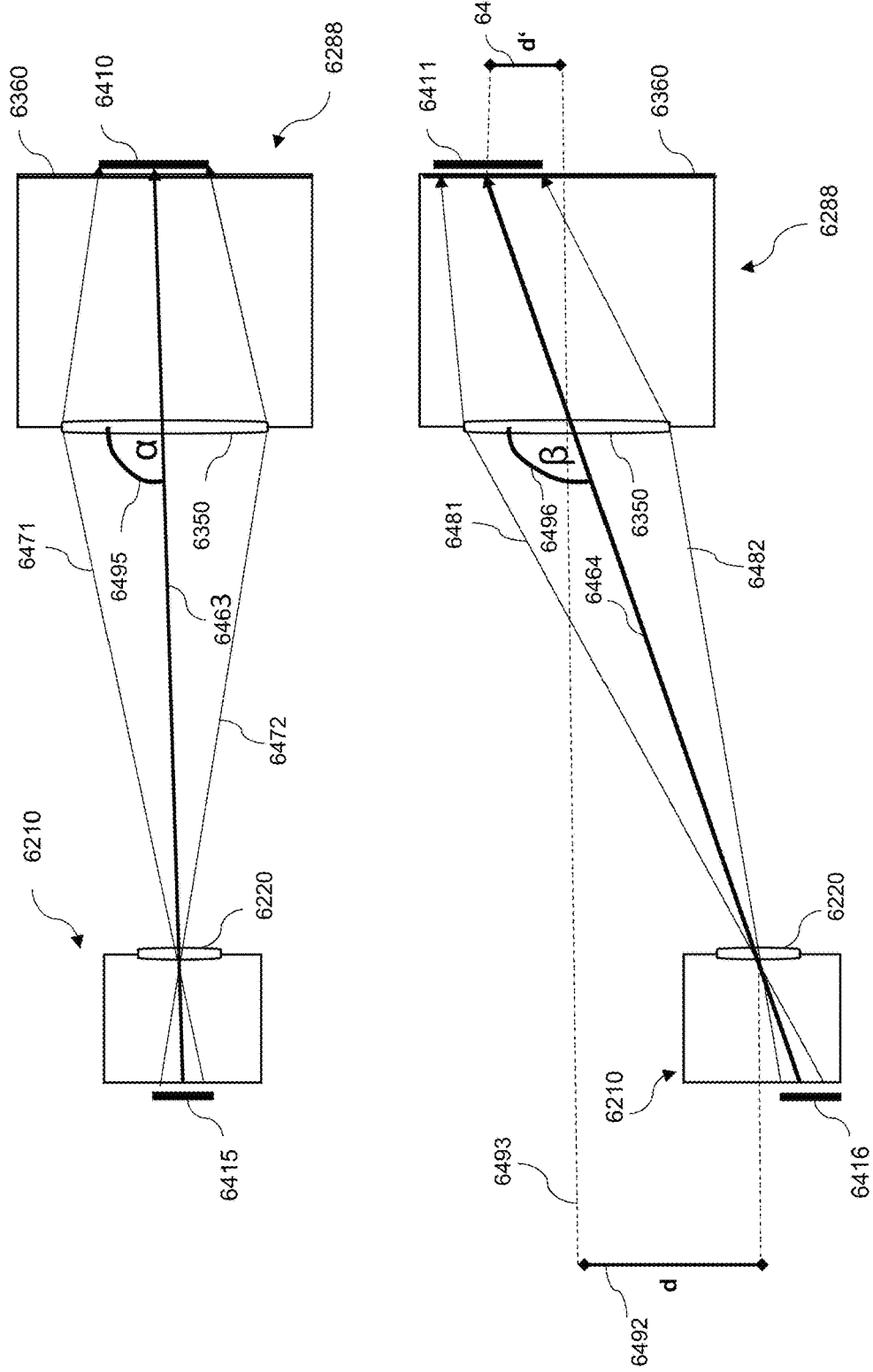
FIG. 6D is a ray diagram illustrating the angular displacement of a bokode beacon against a bokode detector.

FIG. 6D shows a ray diagram which illustrates how the lateral displacement of the image of the circle of confusion is affected by the lateral displacement of the bokode beacon in relation to the bokode detector. In the instant figure, the angle between the bokode beacon 6210 and the bokode detector 6288 is increased from right angle α 6495 to angle β 6496. The angles in the example are measured between the optical axis 6493 of the lens 6350 and the line connecting the centers of the circles of confusion, i.e. 6415 and 6410 in the case of angle α and 6416 and 6411 in the case of angle β. The angular increase between angles α and β corresponds to a lateral offset d 6492 from the principal axis of the convex lens 6350. The lateral offset d 6492 is proportional to the corresponding offset d' 6491 of the center point of the circle of confusion 6411 against the optical axis 6493 of the lens 6350. The bokode detector may be configured to detect the center of the circle of confusion 6411. This can be achieved by image analysis, for example. In a preferred embodiment, the bokode detector estimates angle β by first determining the central datamatrix cell which can be detected inside the circle of confusion. Since every datamatrix cell carries a unique identifier, it is hence possible for those skilled in the art to determine angle β simply by determining the identifier of the central datamatrix element, looking up the identifier in a table which has stored the datamatrix positions of the bokode pattern 6260 and applying a series of trigonometrical calculations in order to determine the angular position of the detected bokode beacon in relation to the optical axis of lens 6350 of the bokode detector 6360.

Figure 7:
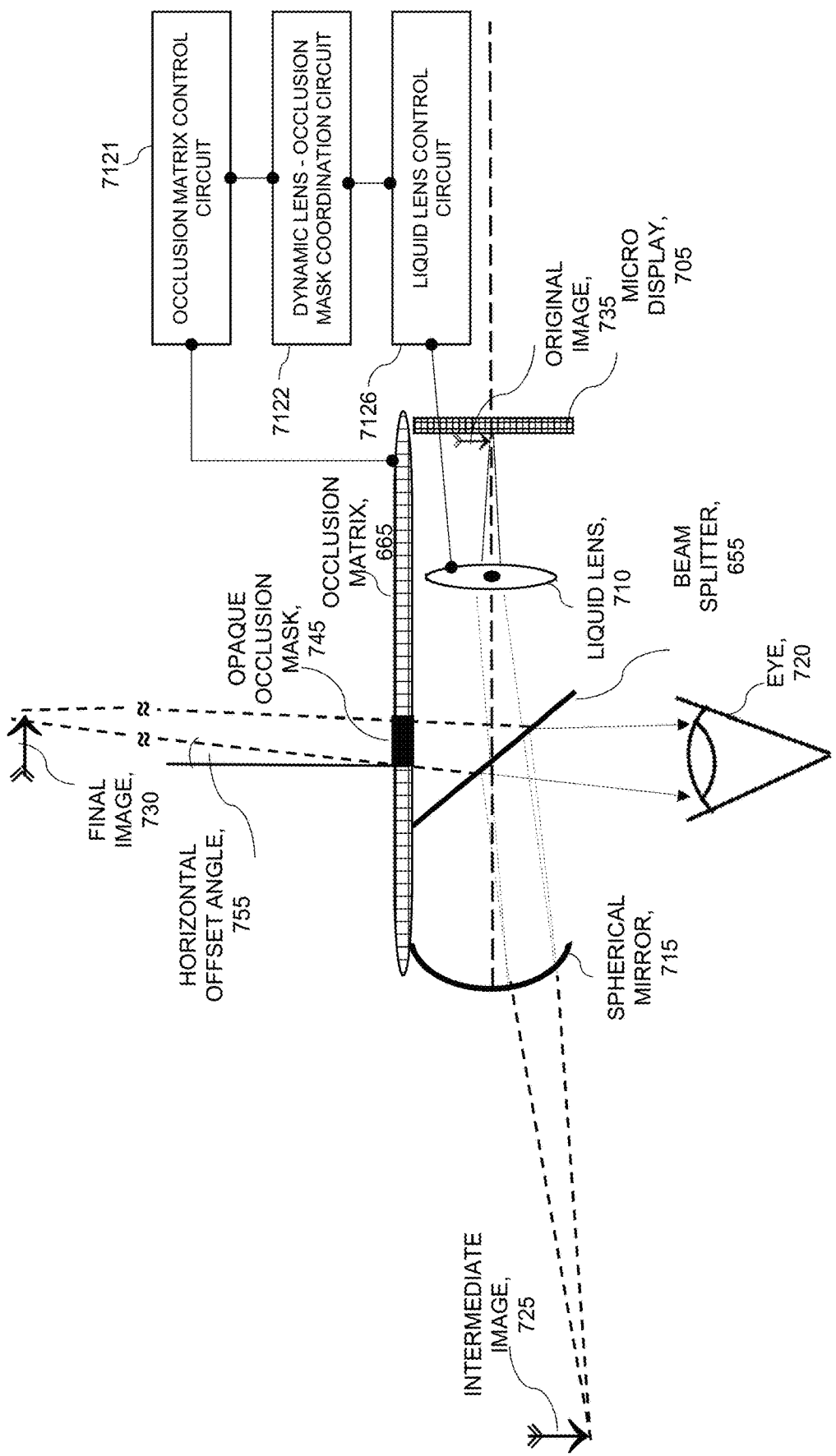
FIG. 7 illustrates an exemplary embodiment comprising an optical system with a liquid lens.

FIG. 7 illustrates the optical design of a preferred embodiment of the present invention. The system consists of five major components: a micro display 705, a focusing lens 710, a beam splitter 655, a spherical mirror 715 and an occlusion matrix 665. The lens is composed of an accommodation lens, realized as a liquid lens 710, with varying optical power $\varphi_A$ and an objective lens with a constant optical power $\varphi_O$. The two lenses together form an intermediate image of the micro display on the right side of a spherical mirror 715. The spherical mirror 715 then relays the intermediate image and redirects the light toward the user's eye 720 through the beam splitter 655. Because of the fact that the liquid lens is the limiting aperture of the optics it is placed at the center of curvature of the spherical mirror so that a conjugate exit pupil is formed through the beam splitter. Placing the eye at the conjugate pupil position, the viewer sees both the virtual image of the micro display and the real world through the beam splitter. The real world behind the virtual image, however, may obscured by means of an occlusion mask 665 which renders the glasses of the head mountable device opaque in the area defined by the occlusion mask.

Figure 7A:
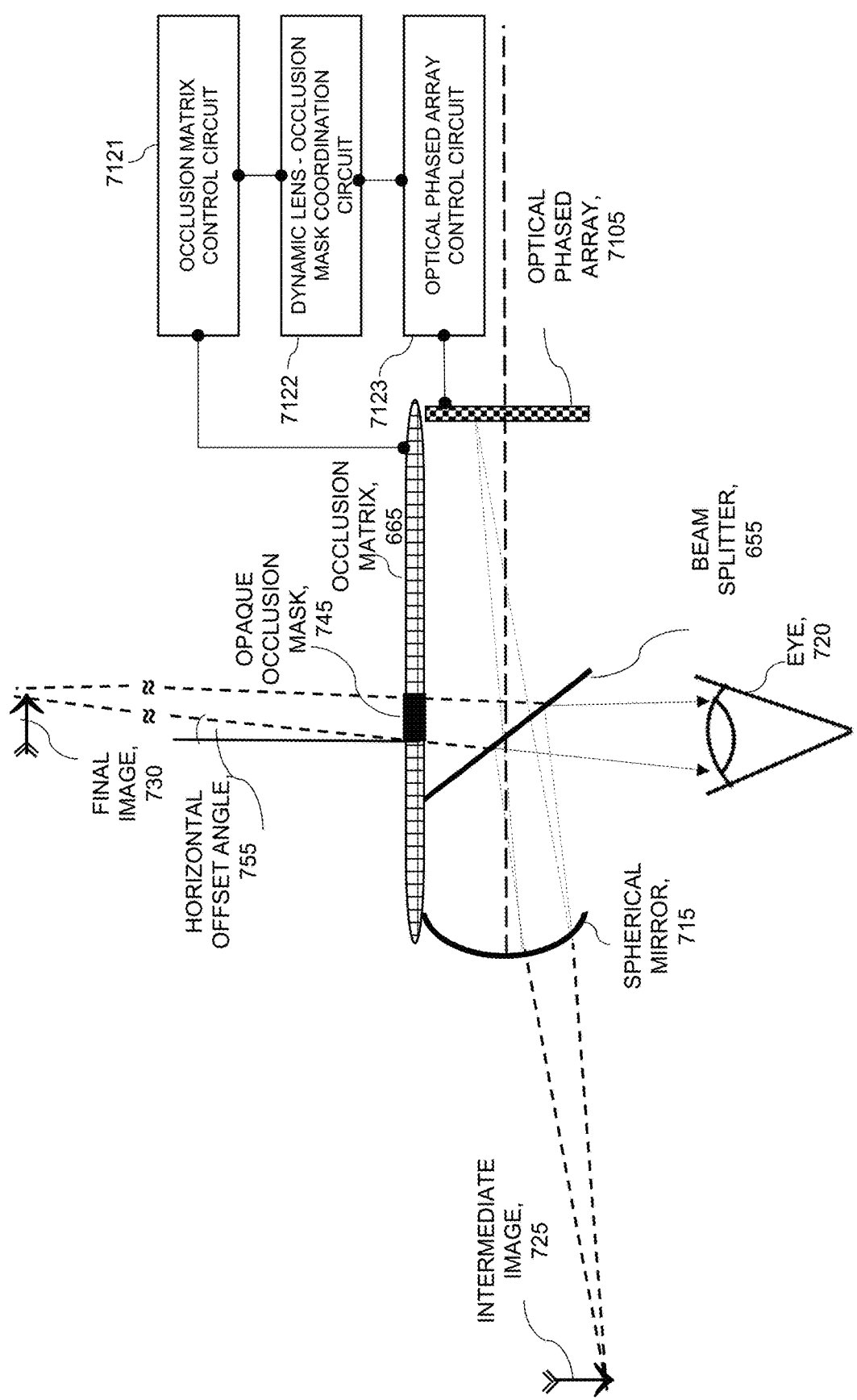
FIG. 7A illustrates an alternate embodiment comprising an optical system with an optical phased array.

As the liquid accommodation lens changes its optical power, the intermediate image will be displaced towards or away from the focal plane of the spherical mirror. Correspondingly, the virtual image will be formed either far or close to the eye. Based on the first-order optics, the accommodation cue d of the head mountable device, which implies the distance from the eye to the virtual image plane, is determined by:

$$d = \frac{-uR}{2u + R + uR\varphi} \quad \text{(Eq. 1)}$$

where $\varphi=\varphi_O+\varphi_A-\varphi_O\varphi_A\varphi t$ denotes the combined optical power of the focusing lens, t is the separation between the objective and accommodation lenses, u is the object distance from the micro display to the focusing lens and R is the radius of curvature of the spherical mirror. The liquid lens may be controlled in terms of focus and tilt by a liquid lens control circuit 7126. Conversely the occlusion matrix may be controlled by an occlusion matrix control circuit 7121 which is tasked with occlusion mask rendering. In order to ensure that the occlusion mask always lines up with the image of the virtual monitor, a dynamic lens/occlusion mask coordination circuit 7122 may also used. Said coordination circuit may take into account the response times of the electro-optical components and actively cause whichever is the faster performing component to slow down in order to match the response curve of the slower component. The coordination circuit may also take into account response thresholds of the electro-optical components. For example, a liquid lens is restricted in terms of angular response. Therefore, it is important that the coordinator module ensures that when the maximum angular deflection capability of the liquid lens is reached, that the occlusion mask is not extended further, even if a user movement would ordinarily command further response by both liquid lens and occlusion matrix. Hence by knowing the individual performance limits of the electro-optical components, i.e. dynamic lens and occlusion matrix, the coordinator can ensure that both components smoothly interoperate with each other. An alternate embodiment may use an optical phased array control circuit 7123 in lieu of the liquid lens control circuit 7126. FIG. 7A depicts such an alternative embodiment where an optical phased array chip 7105 is used in lieu of the liquid lens 710 and micro display 705.

A proof-of-concept embodiment uses an Arctic 320 liquid lens (manufactured by Varioptic Inc.) which has a varying optical power from −5 to 20 diopters by applying an AC voltage from 32 $V_{rms}$ to 60 $V_{rms}$. The liquid lens, with a clear aperture of 3 mm, is attached to a singlet lens with an 18 mm focal length. The virtual image emitter in the proof-of-concept embodiment is a 0.59" full-color organic light emitting diode micro display with 800×600 pixels and a refresh rate up to 85 Hz (eMagin Inc.). The spherical mirror in the proof-of-concept embodiment has a radius of curvature of 70 mm and a clear aperture of 35 mm. Based on those parametric combinations the described embodiment yields an exit pupil diameter of 3 mm, an eye relief of 20 mm, a diagonal field of view (FOV) of about 28°, and an angular resolution of 1.7 arcmins.

The occlusion matrix in the preferred embodiment is realized by a liquid crystal based optical shutter that controls the light transmittance by an externally applied drive voltage. The shutter consists of a polarization modulator in the form of liquid crystal cells positioned between linear polarizers. Applying the drive voltage reorients the birefringent liquid crystal molecules, changing the phase retardation of light passing through the liquid crystal cell. This results in a change in transmittance of light passing through the full shutter structure. Analogue gray-scale operation between fully open and closed states is realized by voltage amplitude modulation, allowing the shutter to be used as a variable filter. The occlusion matrix in the proof-of-concept embodiment was realized with occlusion matrix elements made from cells comprising the PolarView®-ND(14)-F component (manufactured by LC-Tec AB, Sweden). The flexible substrates allow uniaxial bending for use as an electronic dimming filter. The standard diming range is between 50% and 5%, but can be tuned if desired. The closed state transmittance is ≤5% with 7.0 $V_{RMS}$. The preferred embodiment allows variable dimming by the occluding pixels, as well as variable dimming for contrast enhancement on the non-occluding pixels. Moreover, the preferred embodiment can also be used as smart sunglasses with variable dimming, when not in use as a virtual monitor. If variable dimming is not required and maximum occlusion is desired at all times, then an alternative embodiment uses X-FOS(G2) cells (manufactured by LC-Tec AB). These cells have an open-state transmittance of ≥37.5% and are nearly fully light-absorbing in the closed state.

Another alternative embodiment uses a high-speed transmissive spatial light modulator that controls the intensity of passing light through attenuation. Real world light rays are blocked if they coincide with the occlusion mask relating to the virtualized screen which is intended to appear opaque. The occlusion mask for the spatial light modulator embodiment may be specified as a light field, wherein the occlusion mask light field is a mirror image of a hypothetical image light field pertaining to the virtual screen, where object pixels within the occlusion mask are assigned an intensity of 0 (opaque) and all other pixels are assigned an intensity of 1 (transparent). The spatial light modulator embodiment of the present invention requires at least 480 Hz modulators for smooth motion at 60 Hz. However, panels in excess of 240 Hz rates would also be sufficient. High light efficiency of the spatial light modulator is also an important consideration for the see-through design. A considerable amount of light is lost through the polarizers of liquid crystal displays. Therefore, in order to provide high spatial resolution over a wide field of view ultra-high density modulators are needed to be scaled up to the size of the eyeglasses of the head mountable device in an embodiment. A simple proof-of-concept embodiment uses a liquid crystal spatial light modulator obtained from a Epson Powerlite 5000 3LCD projector having a 26.4 mm by 19.8 mm active area, a 800 by 600 resolution and a 85 Hz refresh rate.

Another embodiment uses guest-host type liquid crystal attenuator cells for realizing the occlusion matrix. Said cells may comprise liquid crystal molecules, dichroic dye molecules, and polymer networks. When linearly polarized light oscillates along long axes of dye molecules, the light is strongly absorbed. Otherwise, the light is weakly absorbed as the linearly polarized light oscillates along short axes of dye molecules. At the voltage-off state liquid crystal molecules, dye molecules and polymer networks are oriented along the z-direction. When unpolarized light propagates along the z-direction, whereby the light experiences little absorption and little scattering. At the voltage-on state, the liquid crystal molecules randomly tilt away from z-direction due to negative dielectric anisotropy. In addition, the dye molecules are reoriented by liquid crystal molecules. When the unpolarized light along the z-direction enters to the liquid crystal attenuator, the light is absorbed and scattered. The light absorption and scattering reaches maximum when the liquid crystal molecules and dye molecules are randomly distributed along x-y plane. By adjusting the domain size of the polymer networks, the scattering may be reduced. Light absorption and scattering are polarization independent which indicates that the guest-host type liquid crystal attenuator cells are polarizer-free.

Figure 9:
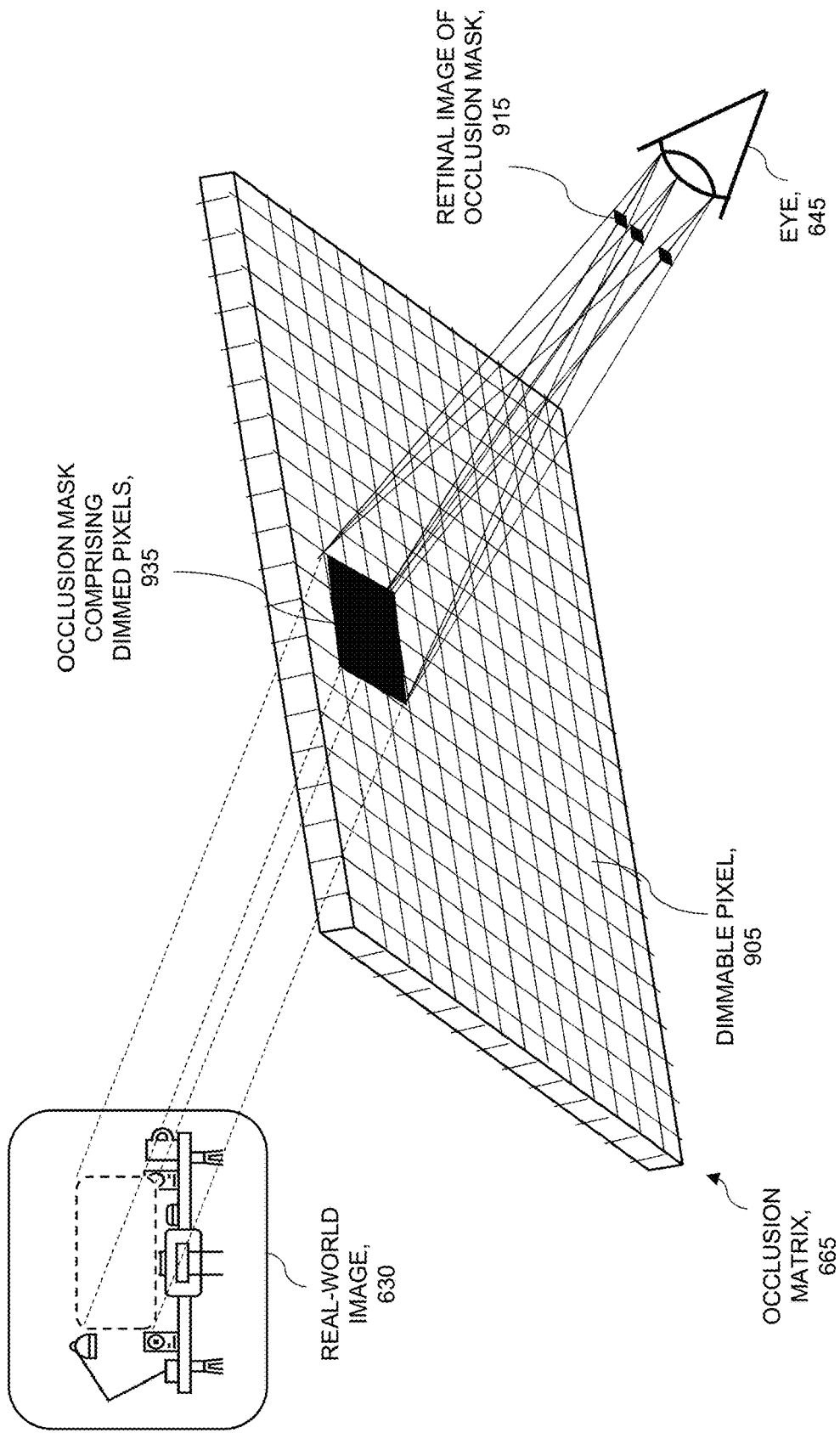
FIG. 9 illustrates an exemplary embodiment and depicts the role and structural makeup of the occlusion matrix.
Figure 9A:
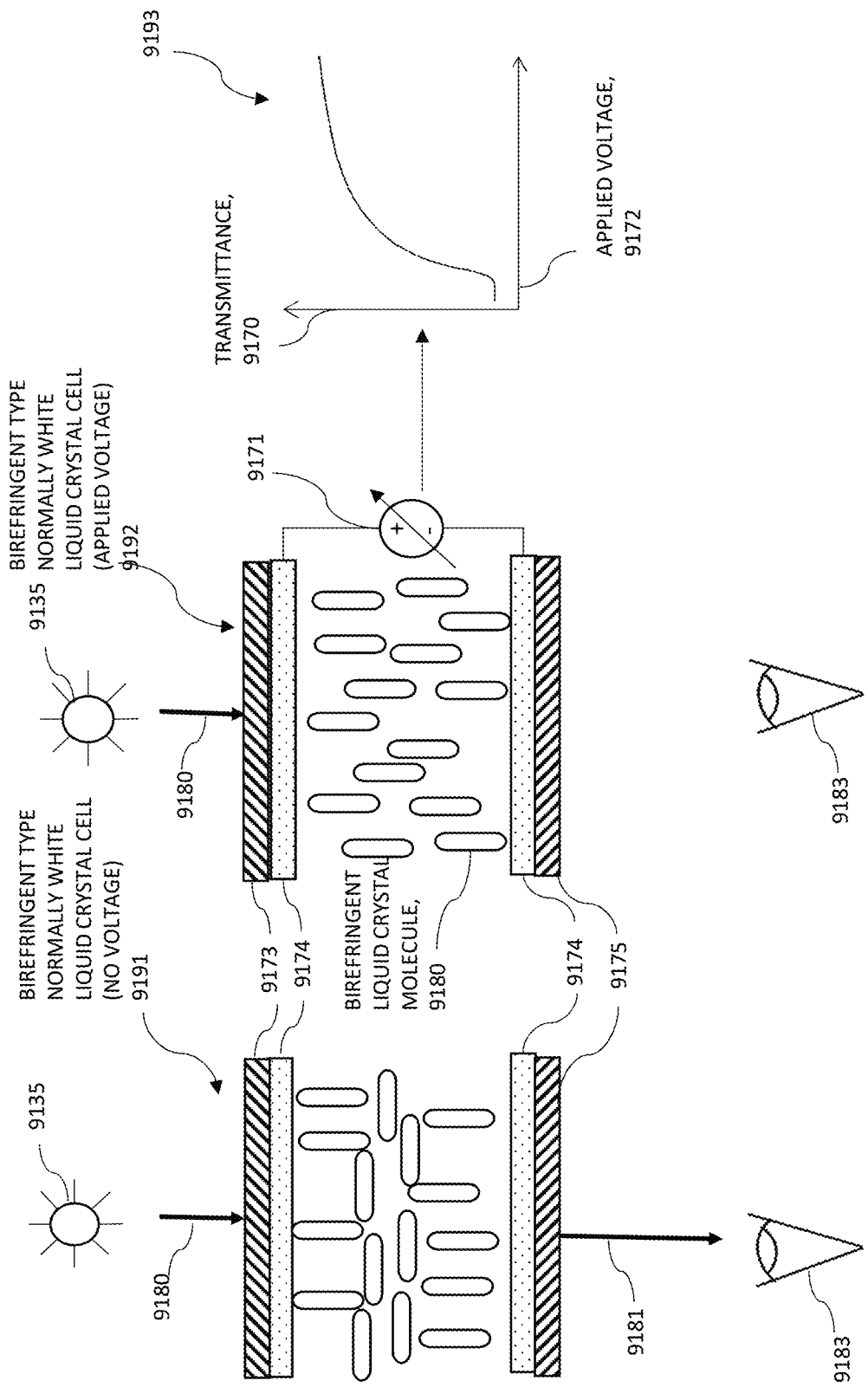
FIG. 9A illustrates an exemplary embodiment and depicts structural makeup of the occlusion matrix dimmable cells.
Figure 9B:
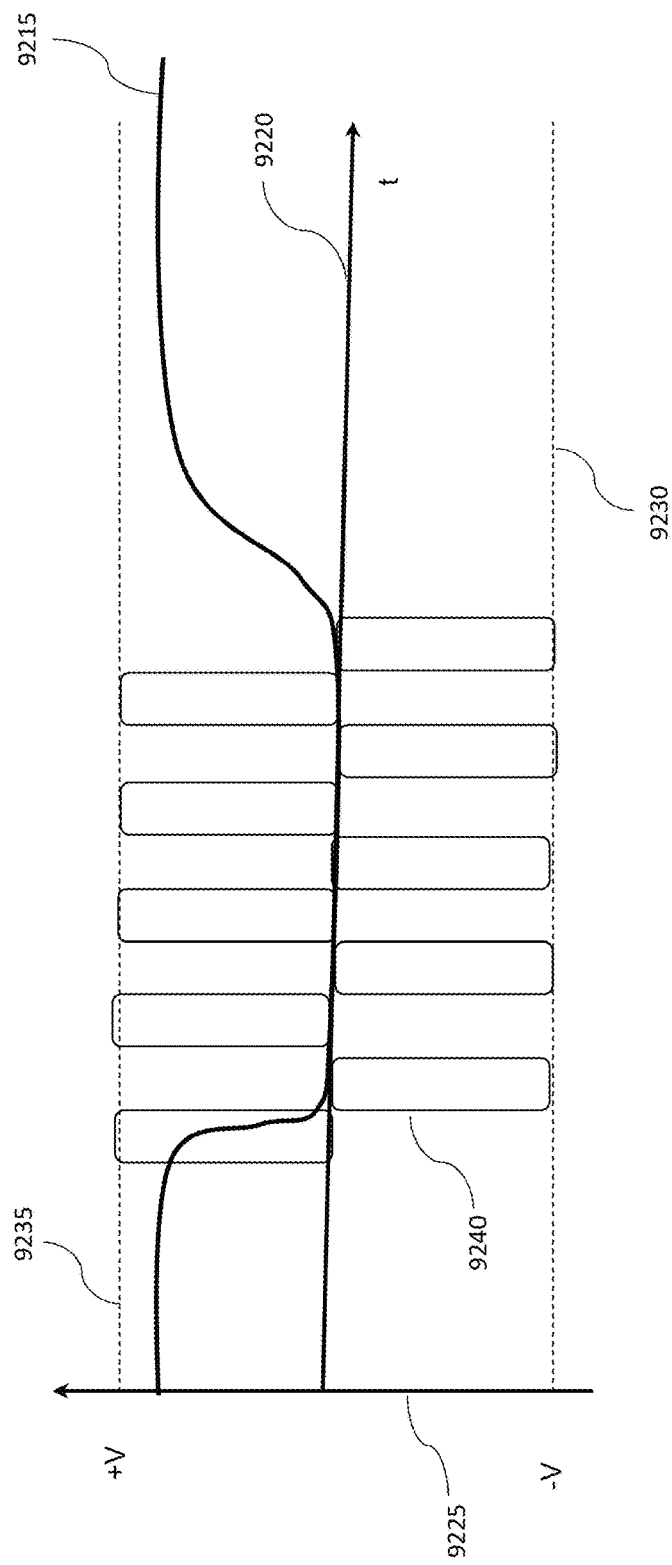
FIG. 9B illustrates an exemplary graph and depicts the driver voltage for controlling the dimmable occlusion matrix cells.
Figure 9C:
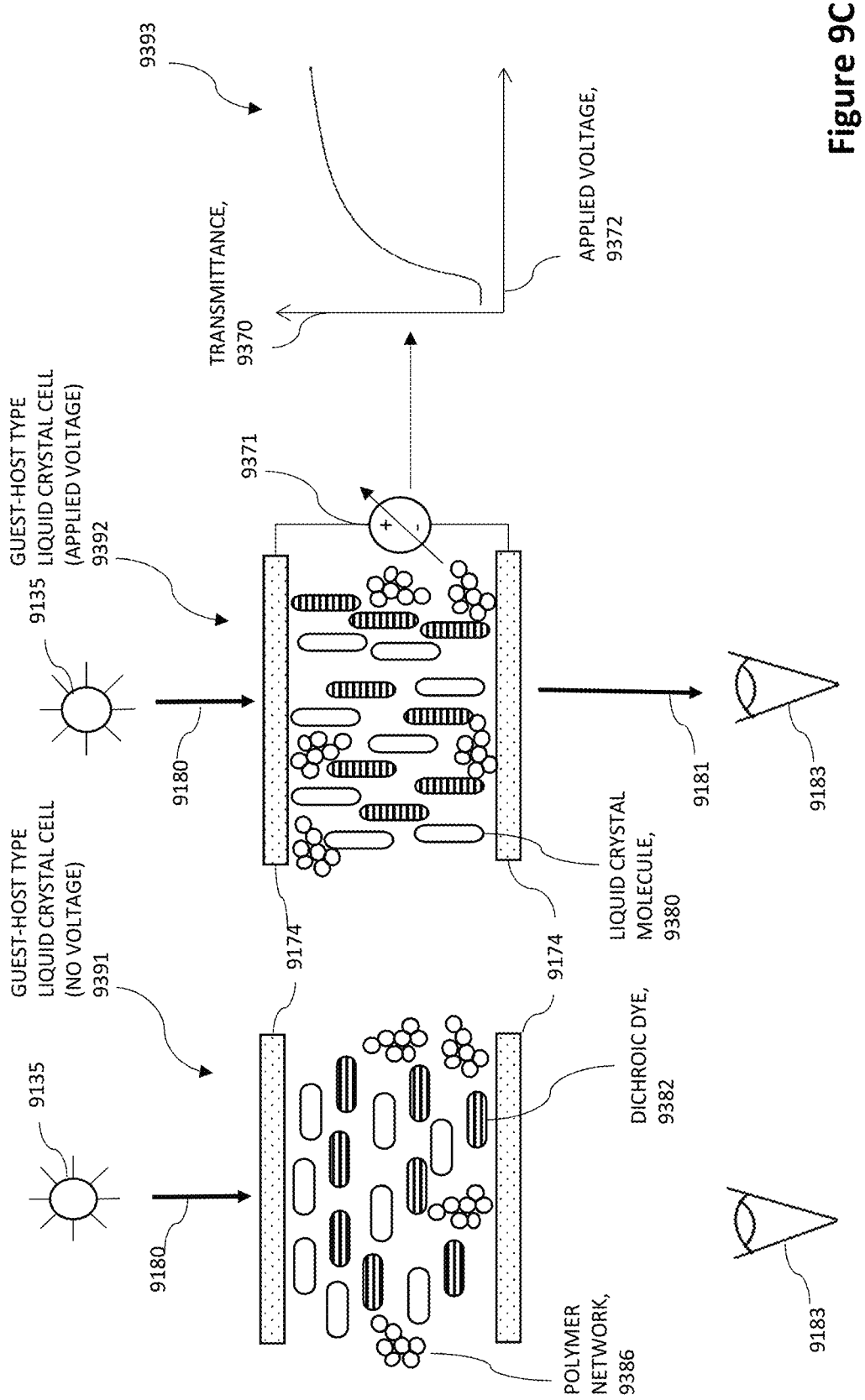
FIG. 9C illustrates an alternate embodiment of an occlusion matrix cell and depicts structural makeup of said cell.

Another alternative embodiment for the occlusion matrix may use a hybrid approach between the guest-host type liquid crystal cells depicted in FIG. 9C and the birefringent liquid crystal cells depicted in FIG. 9A. This embodiment may use cells comprising birefringent liquid crystals alongside dichroic dye and polymer networks.

FIG. 8 depicts the advantageous properties of the liquid lens used in the preferred embodiment of the present invention. A liquid lens of the type shown in the figure is capable of changing tilt along two axes and simultaneously varying focus. The liquid lens comprises two different types of fluids, one of which is conducting 810, the other one is insulating 815. The liquids are enclosed in transparent windows 830. A plurality of at least two electrodes 825 applies a voltage differential between the conducting and the insulating liquid causing the conducting liquid to change surface shape. Using the voltage differentials as a means for controlling the optical properties of the lens, it becomes possible to use the liquid lens for tilting 801, convergence 802 and a combination of both 803. When a liquid lens is used to project an image of a virtual monitor at a distance $d_{image}$, then $d_{image}$ is a function of the voltage applied to the liquid lens according to the following equation:

$$d_{image}(V) = \frac{-1}{2 \times P_{liquidlens}(V) + P_{mirror} - \frac{1}{d_{system}}} - d_1 \quad \text{(Eq. 2)}$$

Where $P_{liquidlens}$ is the lens power of the liquid lens 710, $P_{mirror}$ is the lens power of the concave mirror 715, $d_{system}$ is the effective optical path between micro display 705 and the liquid lens 710, $d_1$ is distance between beam splitter 655 and liquid lens 710.

Figure 8A:
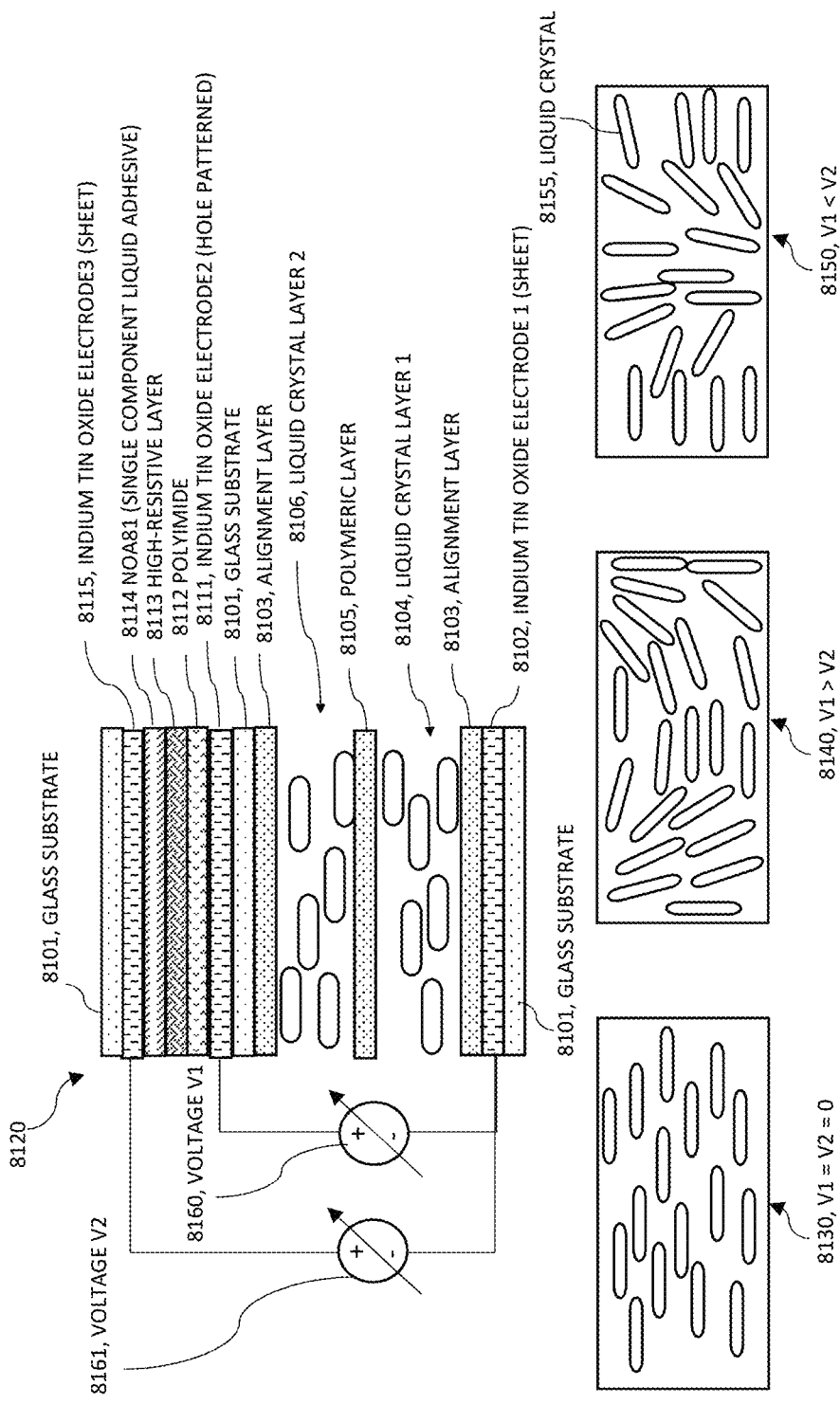
FIG. 8A illustrates an alternate embodiment with focus on the liquid lens components and their operation.

An alternative embodiment of a liquid lens is depicted in FIG. 8A. The structure of the lens 8120 mainly consists of 3 layers of glass substrate 8101, two layers of indium tin oxide (ITO) sheet electrode 8102 and 8115, a layer of hole-patterned ITO electrode 8111, an insulting layer 8114, one high resistive layer 8113, a layer of polyimide (PI) 8112, two alignment layers (polyvinyl alcohol (PVA) and polyimide (PI)) 8103, a polymeric layer with identical alignment ability in both sides 8105, and two liquid crystal layers 8106 and 8106. The liquid lens is polarization dependent because the light reflected from the micro display is linearly polarized. FIG. 8A illustrates a liquid lens at $V_1=V_2=0$ 8130, where $V_1$ 8160 and $V_2$ 8161 are denoted as voltages applied to the hole-patterned electrode 8111 and flattened electrode 8115, respectively. Reference numerals 8140 and 8150 represent the top liquid crystal layers of the liquid lens at different voltages. The bottom liquid crystal layer of the liquid lens may be identical to the top liquid crystal layer. The lens power of the liquid lens is zero at $V_1=V_2=0$ 8130. When $V_1>V_2$, 8140 the electric field in the periphery of aperture is stronger than the one in the center of aperture; therefore, the liquid crystal molecules near the periphery of the hole-patterned electrode are more perpendicular to the glass substrate than those in the center. When $V_1<V_2$ 8150, the hole-patterned electrode provides a weaker electric field than the flat electrode does, which makes the liquid crystal molecules in the center of aperture more perpendicular to the glass substrate than those in the periphery. Those skilled in the art will realize that the instant invention regarding virtual monitors may also be practiced with any other type of liquid lens allowing placement of the image of the virtual monitor by means of electrical control of either focus and/or tilt optical properties of said lens.

Figure 9D:
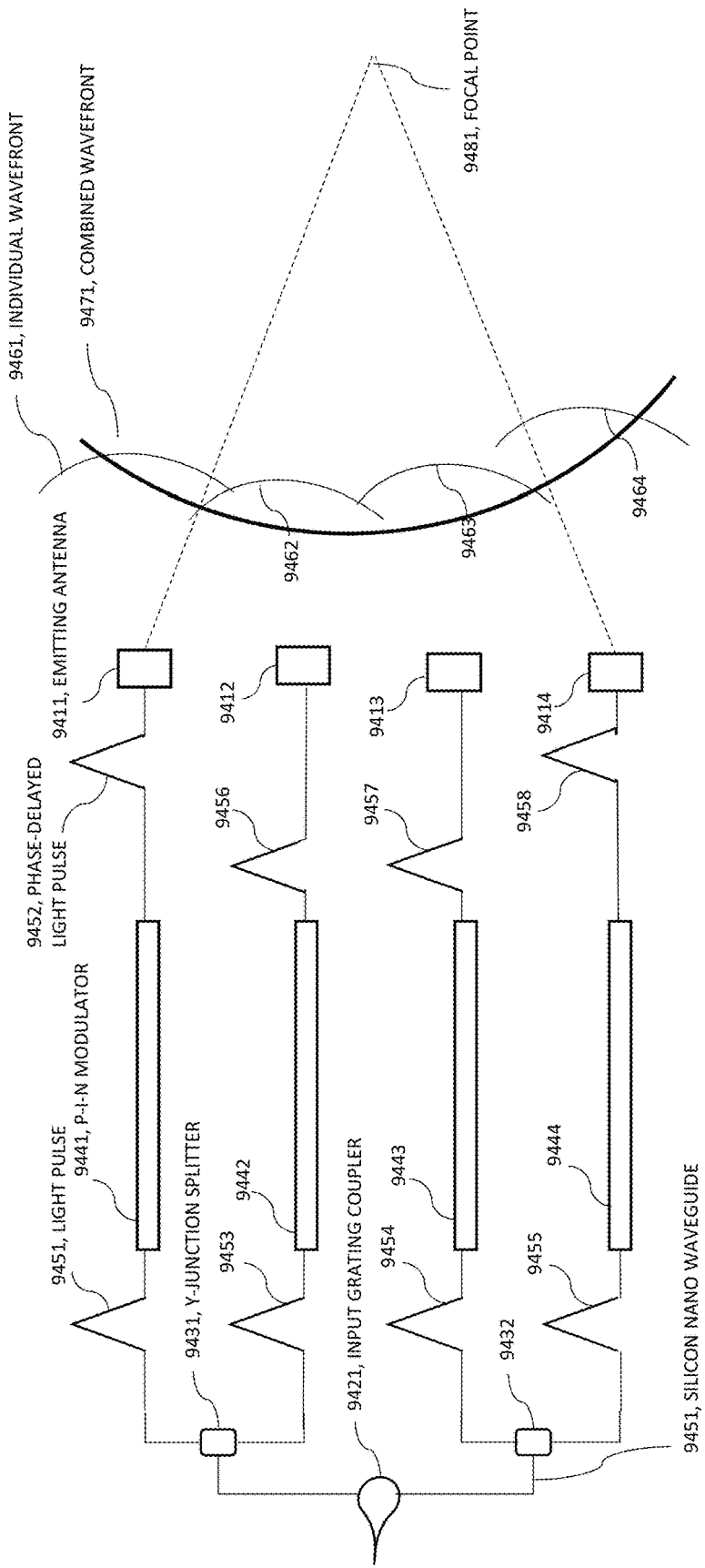
FIG. 9D illustrates an exemplary embodiment of a dynamic lens comprising an optical phased array.
Figure 9G:
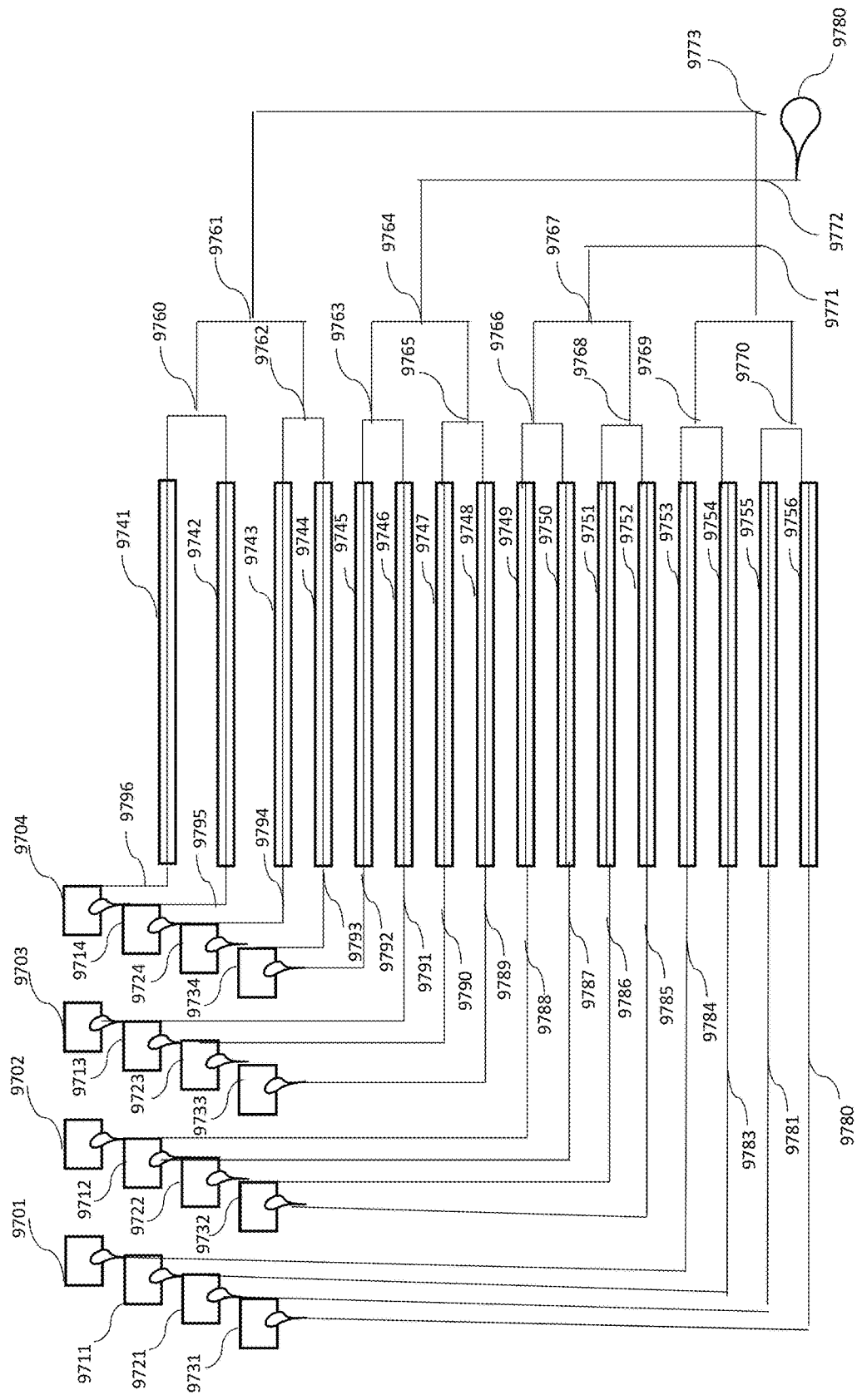
FIG. 9G illustrates an exemplary embodiment of a chip comprising an optical phased array.

Furthermore, the instant invention may also be practiced in the form of lensless embodiments. In the lensless embodiments, the combination of liquid lens and micro display of the preferred embodiment may be substituted by an optical phased array, for example. The lensless embodiment is configured to project an image of the virtual monitor by vector or raster scan of the beam spot without requiring the use of a lens or any other optical components. This allows the virtual screen emitter 1040 to be integrated on a single photonic chip. FIG. 9D illustrates an example of an optical phased array as is required for a lensless embodiment of the present invention. Such optical phased arrays consist of an M×N array of photonic antennas 9411 9412 9413 9414 that emit at the same frequency. The phase of the emitted optical wave from each antenna may be independently adjusted. The depicted example shows an optical phased array which is implemented by having a single laser source directed at an input grating coupler 9421 and multiple phase shifters 9441 9442 9443 9444. The laser output can be carried by silicon nano waveguides and may be divided into multiple optical branches using Y-junction splitters 9431 9432 with an independently controlled optical phase shifter 9441 9442 9443 9444 placed on each branch. An optical antenna 9411 9412 9413 9414, such as a grating coupler or edge coupler, is placed at the end of each branch forming an array of emitters enabling control of the far-field wave front. The far field wave front is comprised of individual wavefronts 9461 9462 9463 9464 which together form a combined wavefront 9471 which in turn has a focal point 9481. The phase shifters 9441 9442 9443 9444 can be implemented as passive delay elements or as active phase shifters. In a preferred embodiment p-n or p-i-n junction based phase shifters are utilized, since they exhibit a much faster electro-optic response compared to thermo-optic or opto-mechanical phase shifters. The instant diagram symbolically illustrates the phase shift by depicting phase-aligned light pulses 9451 9453 9454 9455 which are translated into phase-shifted light pulses 9452 9456 9457 9458. The diagram in FIG. 9D depicts only one single dimension of a two-dimensional optical phased array. The array has M×N radiating elements with a physical aperture which is $d_s$ on its side are spaced apart by d along the x and y axis. The area inside which the beam can be steered is proportional to:

$$\frac{\lambda_0 z_0}{d_s} \qquad (Eq.\ 3)$$

where $\lambda_0$ is the wavelength of the projected light, $z_0$ is the displacement in the z-direction and $d_s$ is the physical aperture of the phased array on its side. In the context of the lensless embodiment of the virtual monitor invention, it is this relationship which determines the physical limits of potential virtual monitor placement and therefore becomes a parameter in the dynamic lens/occlusion matrix coordination circuit 7123. The following equation is key to enabling the dynamic lens/occlusion matrix control circuit 7123 to estimate the area of the occlusion matrix which has to be rendered opaque:

$$|AF_x| = \frac{\sin\left[M\left(\frac{\pi d}{\lambda_{0z0}}x - \frac{\Delta\phi_m}{2}\right)\right]}{\sin\left[\frac{\pi d}{\lambda_{0z0}}x - \frac{\Delta\phi_m}{2}\right]} \qquad (Eq.\ 4)$$

and $$|AF_y| = \frac{\sin\left[M\left(\frac{\pi d}{\lambda_{0z0}}y - \frac{\Delta\phi_n}{2}\right)\right]}{\sin\left[\frac{\pi d}{\lambda_{0z0}}y - \frac{\Delta\phi_n}{2}\right]} \qquad (Eq.\ 5)$$

where $AF_x$ and $AF_y$ are normalized array factors along the x and y axis. The equation, which is based on the Fraunhofer far field approximation, shows how by varying the phase $\Delta\phi_m$ and $\Delta\phi_n$ the beam which forms the image of the virtual monitor can be steered in the x and y directions. As the image of the virtual monitor is steered in the target x and y directions it is the task of the dynamic lens/occlusion matrix control circuit 7123 to determine which corresponding pixels of the occlusion matrix have to be rendered opaque or suitably dimmed. One unique advantage of the virtual monitor lensless embodiment over the liquid lens embodiment is the possibility to realize a three-dimensional monitor without vergence-accommodation conflict. The liquid lens embodiment is only enabled to render a three-dimensional display on the virtual monitor by stereoscopic means which means that the accommodation distance remains constant. The optical phased array embodiment of the virtual monitor on the other hand is capable of dynamically varying the far field distance $z_0$ which solves the accommodation problem which besets stereoscopic three-dimensional displays. In normal two-dimensional operation of the virtual monitor distance $z_0$ remains constant for the majority of the time, even though it can optionally be adjusted. In such way, the user can simulate moving the monitor in space, e.g. moving it closer or further away from themselves. In three-dimensional mode, however, $z_0$ becomes synonymous with the depth of the projected pixel, i.e. its position along the z-axis. Therefore, operation of the optical phased array type of virtual monitor in three-dimensional mode offers the advantages of increased ergonomy, reduced user fatigue and reduction or elimination of recognized negative physiological side effects of the vergence-accommodation conflict. As a result, in terms of user fatigue the virtual monitor may be used for at least the same time of continuous operation as a conventional hardware monitor in two-dimensional mode, and for a significantly increased time in three-dimensional mode.

FIG. 9F depicts an example layout of a chip wherein an optical phased array of the type illustrated in FIG. 9E is implemented. The depicted array has 4×4 radiating elements, realized as grating couplers 9701 9702 9703 9704 9711 9712 9713 9714 9721 9722 9723 9724 9731 9732 9733 9734 which may be arranged in a parallelogram lattice. Starting from the input grating coupler 9780 the light may be guided through a network of Y-junction splitters 9760 9761 9762 9763 9764 9765 9766 9767 9768 9769 9770 9771 9772 9773 into 16 p-i-n phase modulators 9741 9742 9743 9744 9745 9746 9747 9748 9749 9750 9751 9752 9753 9754 9755 9756. Within the Y-junction splitter network the splitters may be interconnected using silicon nano waveguides, for example. Similarly, silicon nano waveguides 9780 9781 9782 9783 9784 9785 9786 9787 9788 9789 9790 9791 9792 9793 9794 9795 9796 may be used to connect the p-i-n phase modulators with the respective antennas. Those skilled in the art will realize that said chip may be realized with other parameters also, especially a scaling up in terms of the number of radiating elements is possible. Also other suitable types of splitters, waveguides, antennas, grating couplers and phase modulators may be used in alternate embodiments.

The principles of occlusion masking, such as used in a preferred embodiment of the present invention, are illustrated in FIG. 9. Hence, light rays originating from a real-world scene 630 are routed through occlusion matrix 665, wherein the occlusion matrix is shown to be rendering an instance of an occlusion mask 935. At the entrance pupil of a human eye 645 a retinal image 915 of the occlusion mask is hence formed. In the area of the image of the occlusion mask, light rays from the real-world image 630 are either occluded or substantially dimmed. The preferred embodiment uses a matrix of dimmable liquid crystal cells. An alternative embodiment uses a single modulation layer of a spatial light modulator. However, any technology whereby pixels in a transparent material 905 can be electrically controlled to appear opaque or substantially dimmed would constitute a suitable alternative. A liquid crystal multi-cell shutter would represent one such an alternative embodiment. Another example of an alternative embodiment is where the occlusion matrix is realized by individually addressable attenuator cells based on guest-host liquid crystal gels. Generally, preferred embodiments use liquid crystal technology in order to implement the occlusion matrix because liquid crystal technology offers unique advantages, in particular low power requirements, which is an important aspect for a mobile device, and liquid crystal technology also offers a very high degree of opacity, if required. A suitable alternative to liquid crystal technology would be to use a spatial light modulator in order to realize the occlusion matrix. However, those skilled in the art will realize that any alternative way of occluding, or dimming, a part of a field of view, whether it be mechanical or electro-optical, will permit practicing the occlusion matrix.

FIG. 9A depicts a birefringence-based embodiment of a shutter cell of the type which may be used to make up the pixels of the occlusion matrix. The shutter consists of a polarization modulator in the form of a liquid crystal cell positioned between linear polarizers. Applying a drive voltage reorients birefringent liquid crystal molecules thereby changing the phase retardation of light passing through the liquid crystal cell. This results in a change in transmittance of light passing through the shutter structure. Analogue gray-scale operation between fully open and closed states may be realized by voltage amplitude modulation, allowing the shutter to be used as a variable attenuating filter. The liquid crystal cell 9191 may comprise birefringent liquid crystal molecules sandwiched between transparent electrodes 9174. The transparent electrodes may be made from indium tin oxide in a preferred embodiment, however those skilled in the art will realize that other suitable materials, such as silver nanowire for example, can also be used. The light absorption of birefringent-type cell varies significantly with the external voltage 9171 applied to the transparent electrodes 9174. The depicted liquid crystal cells are of normally white type, whereby normally white type can be achieved by using a polarizer 9173 and an analyzer 9175 with perpendicularly aligned rubbing directions, whereas for a normally black cell the rubbing directions of polarizer and analyzer would be aligned. In this way, without any applied voltage 9191, the director of liquid crystal molecules are uniformly aligned parallel to the indium tin oxide surfaces 9174, and incident light 9180 from an unpolarized real-world light source 9135 is strongly absorbed before it reaches an entrance pupil of a human eye 9183. Otherwise, when applying a sufficient external voltage to the liquid crystal cell 9192 the birefringent liquid crystal molecules 9180 are reoriented parallel to the applied electric field, and the light absorbance of the cell is decreased, as can be seen in the graph 9193. In graph 9193 the y-axis 9170 depicts luminous transmittance, whereas the x-axis 9172 depicts the applied voltage.

FIG. 9B depicts a suitable drive waveform, which may applied to the transparent electrodes of the liquid crystal cell embodiments exemplified in FIG. 9A. The depicted cells possess mono-stable normally white operation. Therefore, without voltage applied the shutter is in its fully open and light-transmitting state. When the drive voltage 9240 is applied, the cell switches to a closed and light-absorbing state. This is exemplified by curve 9215, which signifies light transmittance. Since the transmittance depends on applied drive voltage, also the contrast is a function of the voltage and usually increases with increasing amplitude. In the diagram, the y-axis 9225 denotes the both the drive voltage and light transmittance. The x-axis 9220 denotes the time axis. Depicted is also the positive amplitude 9235 and the negative amplitude 9230. The drive voltage must be continually applied throughout the duration of the time that the shutter is required to be in the closed state. Increasing the drive voltage amplitude increases the contrast and also shortens the closing time. The transmittance of the liquid crystal cell reacts to the root mean square (RMS) voltage. In order to prevent ion migration within the liquid crystal layer that might impair performance and lifetime, it is recommended that there should be no net direct current (DC) bias presence in the drive signal. A proof-of-concept embodiment was using the LCC-230 (manufactured by LC-Tec AB, Sweden) which is a liquid crystal controller which incorporates two independent liquid crystal channels, each with $30V_{RMS}$ of range.

FIG. 9C depicts another embodiment in which the transmittance of an occlusion cell in the occlusion matrix may be dynamically adjusted by using a guest-host type of homogeneous nematic liquid crystal (GH-LC) cell, wherein the GH-LC cell may comprise black dichroic dye 9382 and wherein the driver for controlling occlusion matrix cells may influence both the polarization angle as well as the light absorption characteristics of each individual cell. This is because light absorption of the GH-LC cell for polarized light varies significantly with the external voltage 9371 applied to the transparent electrodes of the GH-LC cell. In this way, without any applied voltage 9391, the director of liquid crystal and dichroic dye molecules are uniformly aligned parallel to the indium tin oxide surfaces 9174, and incident light with a polarization plane parallel to the alignment of the dye molecules is strongly absorbed. Otherwise, when applying a sufficient external voltage to the GH-LC cell 9392 the dichroic dye molecules 9382 aligned with the liquid crystal molecules 9380 are reoriented parallel to the applied electric field, and the light absorbance of the dye is decreased, as can be seen in the graph 9393. In graph the y-axis 9370 depicts luminous transmittance, whereas the x-axis 9372 depicts the applied voltage. Colors other than black may also be used for the dichroic dye. It is also an option to include polymer networks 9386 in the liquid crystal cell. By adjusting the domain size of said polymer networks, scattering can be reduced. The described example embodiment using GH-LC cells was fabricated with injection of a mixture which was composed of nematic liquid crystal ZLI-4788 (Merck, ne=1.6567, $\Delta n=0.1647$ at $\lambda=589$ nm; $\Delta \varepsilon=-5.7$ at f=1 kHz), a diacrylate monomer (bisphenol-A-dimethacrylate), and a dichroic dye S428 (Mitsui, Japan) at 90:5:5 wt % ratios.

FIG. 9E depicts a frontal view 9504 and a side view 9505 of a smart contact lens type embodiment of the present invention. A contact lens type ophthalmic lens 9510 thus includes a rigid insert 9511 with energization elements 9512 outside of the optic zone of the lens. The energization elements are interconnected by connectors 9514. The energization elements 9512 are configured to receive both wireless signals for controlling the active components of the ophthalmic lens and the electrical energy, which is required to power the active components such as the occlusion matrix 9517, the on-board computing system 9513 and the optical phased array 9515. The on-board computing system 9513 may comprise one or more processors, memory and, optionally, communication circuits. In an example embodiment an energization element designed to harvest radio frequency energy was used which consisted of a 1 cm diameter loop antenna comprising 30 AWG (American Wire Gauge) wire and encapsulated in a 200 μm thick layer of poly-dimethylsiloxane. Small loop antennas have non-standard impedances and therefore the impedance of a backscatter switch network needs to be optimized for the impedance of the loop antenna on the contact lens. An antenna of an ophthalmic lens could take other forms, as well. For example, an antenna could also be a patch antenna, a fractal antenna, or some other form of antenna. The energization elements also optionally comprise an interconnected power supply module 9550. The power supply module is configured to provide power from a battery, such as a flexible battery, thin-film battery or solid-state battery to the active elements of the ophthalmic device. The power supply module 9550 may be configured to receive radio frequency energy from the energization elements 9512 and use a regulator to convert the captured energy to a stable direct current supply voltage for buffering the received energy by recharging the inbuilt battery. The rigid insert 9511 can be partially composed of a relatively rigid material, such as polyethylene terephthalate, parylene, polymethyl methacrylate or another material sufficient to structurally support circuitry and/or electronics. The rigid insert 9511 may comprise an on-board computing system 9513 in the form of an integrated circuit chip. The chip harvests energy and transforms it into voltage that is necessary to power the active components of the ophthalmic lens. The preferred embodiment consists of a transparent sapphire chip, which is configured to detect Bluetooth beacons and backscatter 2 Mbps Wi-Fi packets. By using the backscatter approach, it becomes possible to stream live video to a virtual monitor implemented on an ophthalmic lens. Other forms of data communication can be used as well; for example, CDMA, EVDO, GSM/GPRS, WiMAX, LTE, infrared, ZigBee, or near field communication. Situated inside the optical zone of the ophthalmic lens is an optional occlusion matrix 9517 in the form of an array of dimmable pixels. In a preferred embodiment said occlusion matrix is made from an array of individually addressable normally white liquid crystal cells. The occlusion matrix 9517 is interconnected with the on-board computing system 9513 in such a way that the processor can control the pixels of the occlusion matrix by sending electrical control signals. Also interconnected with the on-board computing system 9513 is optical phased array 9515. The optical phased array 9515 can be connected to the processor by a transparent nanowire, for example, or a transparent electrode. The minimum focal distance of the human eye does not enable images generated by a micro display to reach the retina from a smart contact lens or bionic lens. Even though the human eye has a minimum focal distance of several centimeters, it is not capable of resolving objects on a contact lens. Optical phased arrays, such as those described in connection with FIG. 9D provide a solution to this challenge. In this way, by dynamically varying phase retardation, a virtual lens can be used to paint an image directly on the retina of an eye of the user. The occlusion matrix 9117 supplements the user experience by optionally occluding said retinal image in order to eliminate ghosting. On the figure, the occlusion matrix is only depicted partially for better readability. The occlusion matrix in a preferred embodiment substantially covers the optical zone of the ophthalmic lens. However, the invention may also be practiced with no occlusion matrix, or an occlusion matrix which only covers part of the optical zone of a smart contact lens. Moreover, the invention, which is partly characterized by the use of an optical phased array for enabling an augmented reality experience in the context of a smart contact lens, may also be practiced without any occlusion matrix. Occlusion for virtual images on a smart contact lens may alternatively be practiced by using inactive occlusion elements, such as an opaque patch of material statically attached to either the optic zone of the contact lens, or alternatively to the lens of conventional eyeglass lenses. In case said static opaque patch is used, then the position of the virtual image also needs to be static and frozen to a position at which the virtual image coincides with the occlusion patch in such a way that the virtual image, and only the virtual image, becomes opaque. In a preferred embodiment, however, the optical phased array 9515 can be dynamically adjusted to control the user-perceived position of the virtual object in space, and also a dynamic lens/occlusion matrix coordinator circuit is used to synchronize occlusion masking with virtual image rendering. Said coordinator circuit is then integrated with on-board computing system 9513. Some of the components of the described smart contact lens need to be placed inside the optical zone of the ophthalmic lens. The optical phased array 9515 is an example of such a component which is not normally transparent and yet placed inside the optical zone. However, such opaque or only partially transparent components do not significantly interfere with vision because they occupy only a relatively small area of the optical zone and, moreover, they are too close to the retina to be in focus.

Also depicted on FIG. 9D is a side view 9505 of the described smart ophthalmic lens. It shows the optical phased array 9517 being interconnected to the on-board computing system 9513 by wire 9518. The wires which interconnect the active components of the described smart contact lens may be implemented as transparent nanowires or alternate conductive materials. The optical phased array 9517 is generating a retina-directed photon beam 9526 which paints an image by scanning an area on the retina which is delimited by scanning boundaries 9524 and 9525.

FIG. 9E shows an embodiment of the present invention wherein the virtual monitor is rendered by an intraocular device, which is depicted as a frontal view 9604 and a side view 9605. The exposed regions of the intraocular device are made of a polymeric material 9611 formed to be in intimate contact with the inside surface of the lens capsule of an eye. The polymeric material can have a shape corresponding to the shape of the human lens capsule into which the intraocular device is going to be implanted. The intraocular device is configured to be surgically installed within an eye. The polymeric material 9611 can include one or more biocompatible materials, such as those employed for use in implanted ophthalmic applications. The polymeric material 9611 can optionally include an outer coating with such biocompatible materials. The intraocular lens may include one or more substrates for mounting circuitry and or electronic components. Transparent conductive materials such as indium tin oxide or networks of silver nanowires, can be patterned on the substrates to form circuits or electrodes.

Other than the polymeric material 9611 for the intraocular implant and the ophthalmic lens 9510 for the smart contact lens, the system architecture and components of both said embodiments of the present invention, i.e. smart contact lens and smart intraocular device, are essentially identical. Therefore FIG. 10B illustrates the system architecture of both the smart contact lens embodiment (FIG. 9E) and the smart intraocular implant embodiment (FIG. 9F) of the present invention. Due to size restrictions, the smart contact lens and smart intraocular device embodiments of the present invention do not normally comprise the user movement tracking circuit 1020 which is used for the preferred embodiments of the head mountable device embodiments. Therefore the virtual monitors displayed on the preferred embodiments of the smart contact lens and the smart intraocular device may not be anchorable to real world objects. However, smart contact lens and smart intraocular device embodiments may nevertheless be practiced with user tracking circuits. In such embodiments, the user tracking is achieved by means a plurality of a partner devices which may be wirelessly paired. The partner devices, such as a head-mountable device, a smartphone or other mobile computing device, house the necessary sensors in order to determine geolocation and/or viewing angles. Then either sensor readings or command sets derived from sensor readings may be wirelessly communicated to the respective smart contact lens or smart intraocular device. Thus said device may still react to changes in viewer geolocation or viewing angles, despite said device not comprising its own in-built sensors or user movement tracking circuits.

Figure 10:
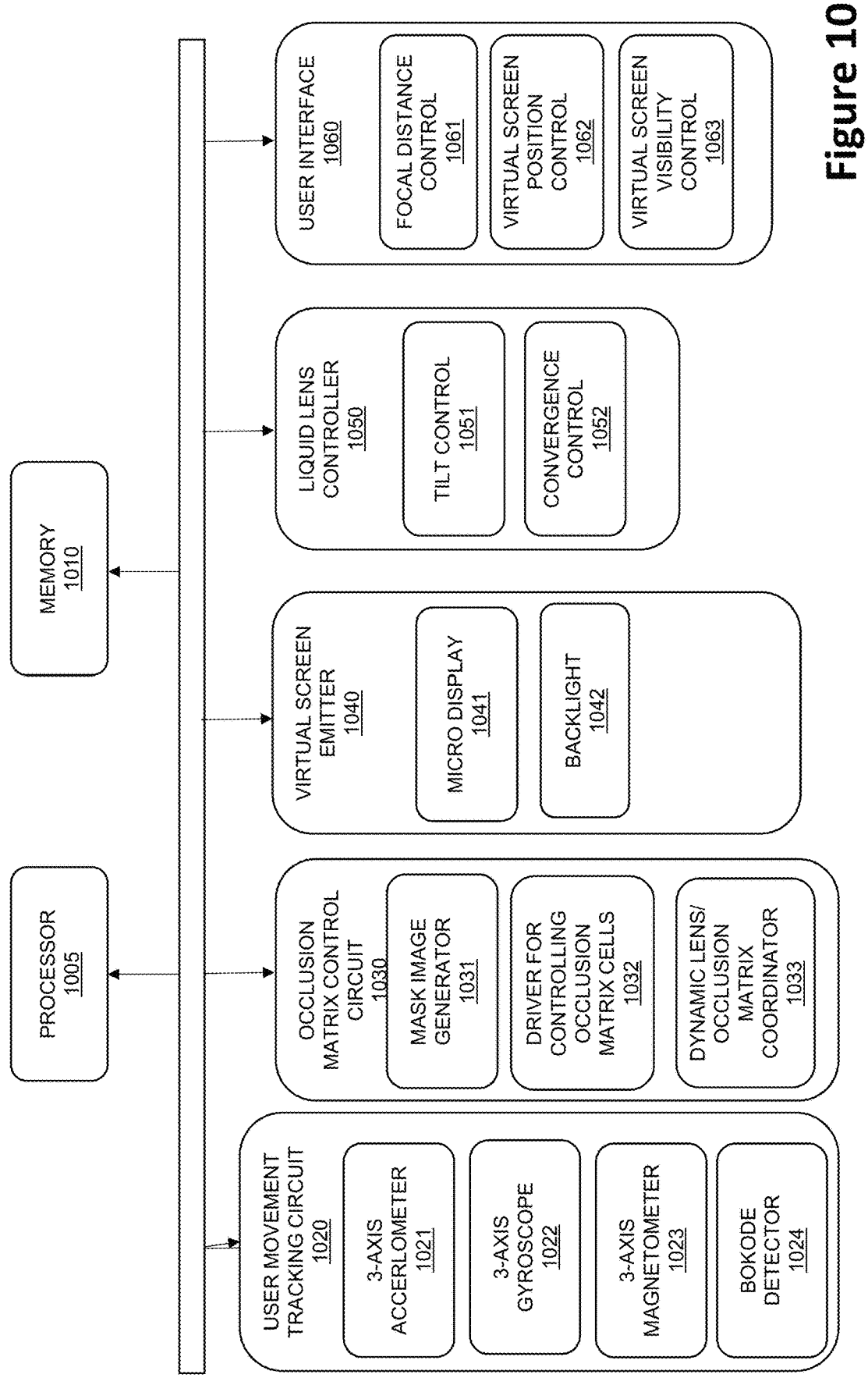
FIG. 10 is a block diagram depicting the system architecture of the optic system controller in the context of an exemplary embodiment of a head-mountable device comprising a liquid lens.

A high-level architectural overview relating to the constituent components of the optical system as realized by the preferred embodiment of the present invention is depicted in FIG. 10. The system comprises a plurality of at least one processor 1005 and memory 1010. A user movement tracking circuit 1020 may be tasked with keeping track of the user's overall position, such as any movements around the rooms or leaving the room, as well as tracking head movements of the user, such as tilting the head up or down. The preferred embodiment may achieve these requirements by using a 3-axis accelerometer 1021, a 3-axis gyroscope 1022, and a 3-axis magnetometer 1023. Those skilled in the art will appreciate that any other sensors capable of fulfilling the same user position and head movement tracking requirements may be used in alternative embodiments. Some embodiments make use of a bokode detector 1024 in order to detect the presence and relative position of virtual monitor anchor points in relation to the head mountable device. The system further may comprise an occlusion matrix control circuit 1030 which may be tasked with controlling individual cells or pixels of the occlusion matrix 665. Said occlusion matrix control circuit may comprise further subsystems. One such subsystem is the mask image generator 1031. The purpose of the mask image generator is to calculate which cells of the occlusion matrix have to be dimmed or made opaque in order for the virtual image of the virtual monitor to be occluded. The mask image generator may not only identify the relevant cells on said matrix, but in some advanced embodiments with a dimming feature also determine the target degree of dimming for each cell. Once the relevant cells have been identified, alongside their target dimming levels, if applicable, a second subsystem of the occlusion matrix control circuit may be required. Said second subsystem is the driver for controlling occlusion matrix cells 1032. The purpose of said subsystem 1032 is to translate the abstract targets which were computed by subsystem 1031 into control signals for the occlusion matrix cells. The occlusion matrix control circuit may comprise a further subsystem, namely the dynamic lens/occlusion matrix coordinator 1033. The term dynamic lens in this context encompasses both liquid lenses, optical phased arrays and any other lens wherein the optical power may be dynamically controlled by electrical control signals. The purpose of the dynamic lens/occlusion matrix coordinator 1033 is to coordinate occlusion masking with virtual image positioning in order to ensure a smooth user experience. The dynamic lens/occlusion matrix coordinator 1033 is useful mainly because of the different response times of the liquid lens or the optical phased array and the occlusion matrix. A liquid lens generally requires a significantly longer response time than the occlusion matrix. Different types of dynamic lens generally have individually different response times. Also, different types of occlusion matrix technologies also come with individually different response times. Therefore, without a dynamic lens/occlusion matrix coordinator, adjustments of the dynamic lens in conjunction with adjustments of the occlusion matrix would not necessary in sync. However, in order to ensure a smooth user experience, it is recommended that the occlusion mask is placed exactly behind the image of the virtual monitor at all times. Therefore, every time an adjustment of virtual monitor placement is required, the dynamic lens/occlusion matrix coordinator may take as input the new target settings for both dynamic lens and occlusion matrix. The dynamic lens/occlusion matrix coordinator then may determine the expected response times of both liquid lens and occlusion matrix and calculate a time-dependent output. That time-dependent output can ensure that whichever component has a faster response time, that component can be artificially slowed down to match the time-dependent response curve of the slower component. Said slowing down may be generally achieved by delaying the sending of the appropriate command outputs by a factor determined by the dynamic lens/occlusion matrix coordinator.

The overall system further comprises a virtual screen emitter 1040, which in turn may comprise a micro display 1041 and a backlight 1042. The liquid lens controller unit 1050 may comprise a tilt controller 1051, which is responsible for repositioning the augmented reality image of the virtual monitor in response to user movements, and a convergence controller 1052, which is responsible for adjusting the focal distance of the virtual monitor. The preferred embodiment also comprises a user interface 1060 which serves the purpose to allow the user to set defaults and initial parameters for the optical system. The focal distance control 1061 determines how far in terms of focal distance the virtual monitor is placed away from the user. The virtual screen position control 1062 may allow the user to set offsets relating to the default position of the virtual monitor in relation to the line of sight of the user. The position control may be somewhat equivalent to the user being able to move the virtual monitor around on their desk similar to how they would be able to reposition a physical hardware-realized monitor. The virtual screen visibility control 1063 relates to the user setting parameters as to when the virtual screen enters auto-hide mode. An advantageous feature of the present invention is that the user can customize a number of parameters comprising maximum head tilt and pan angles as well as distance away from a fixed location, such as the user's desk, which will then auto-hide the virtual monitor once these thresholds are exceeded.

Figure 10A:
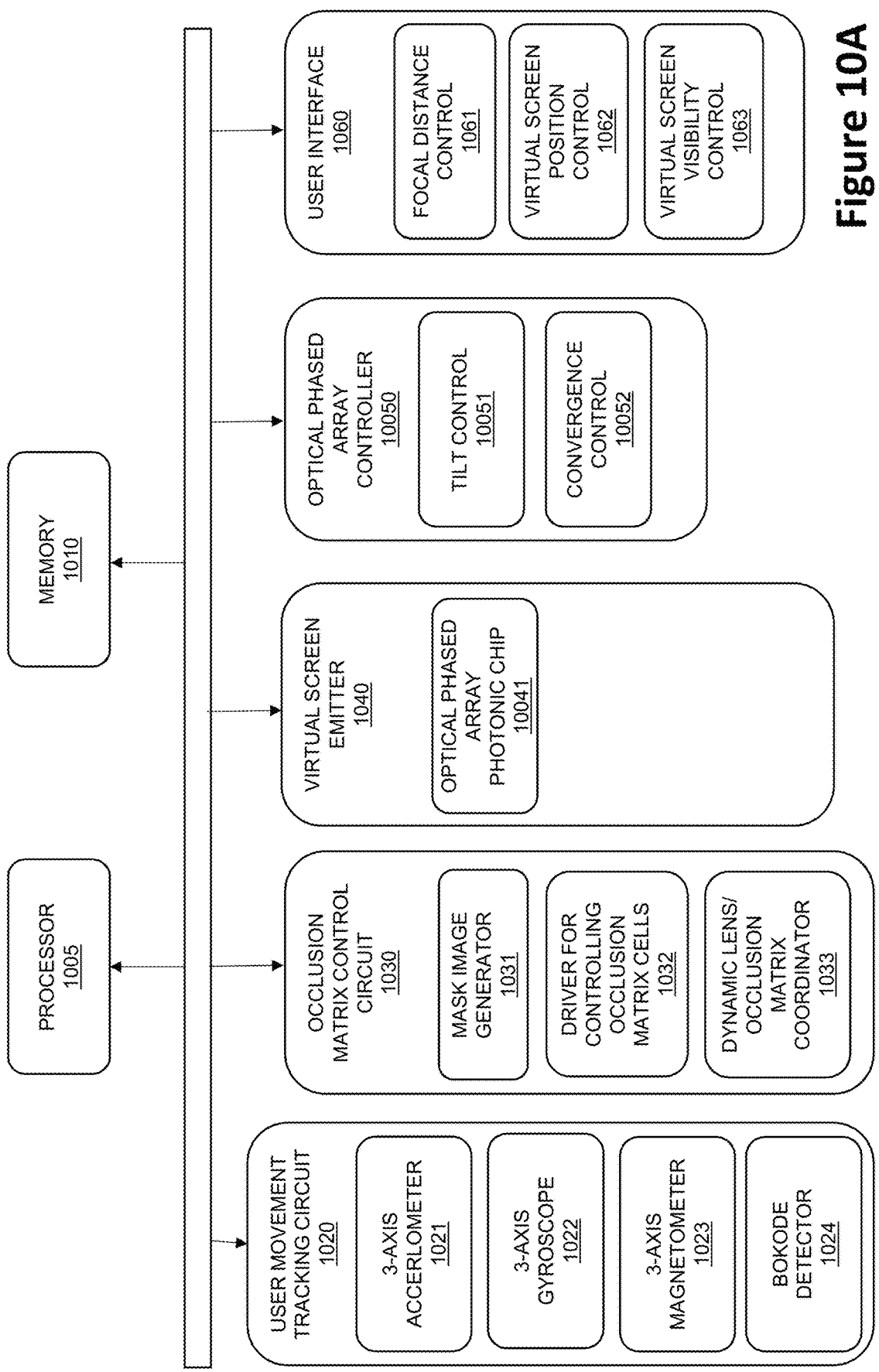
FIG. 10A is a block diagram depicting the system architecture of the optic system controller in the context of an alternate embodiment of a head-mountable device comprising an optical phased array.
Figure 10B:
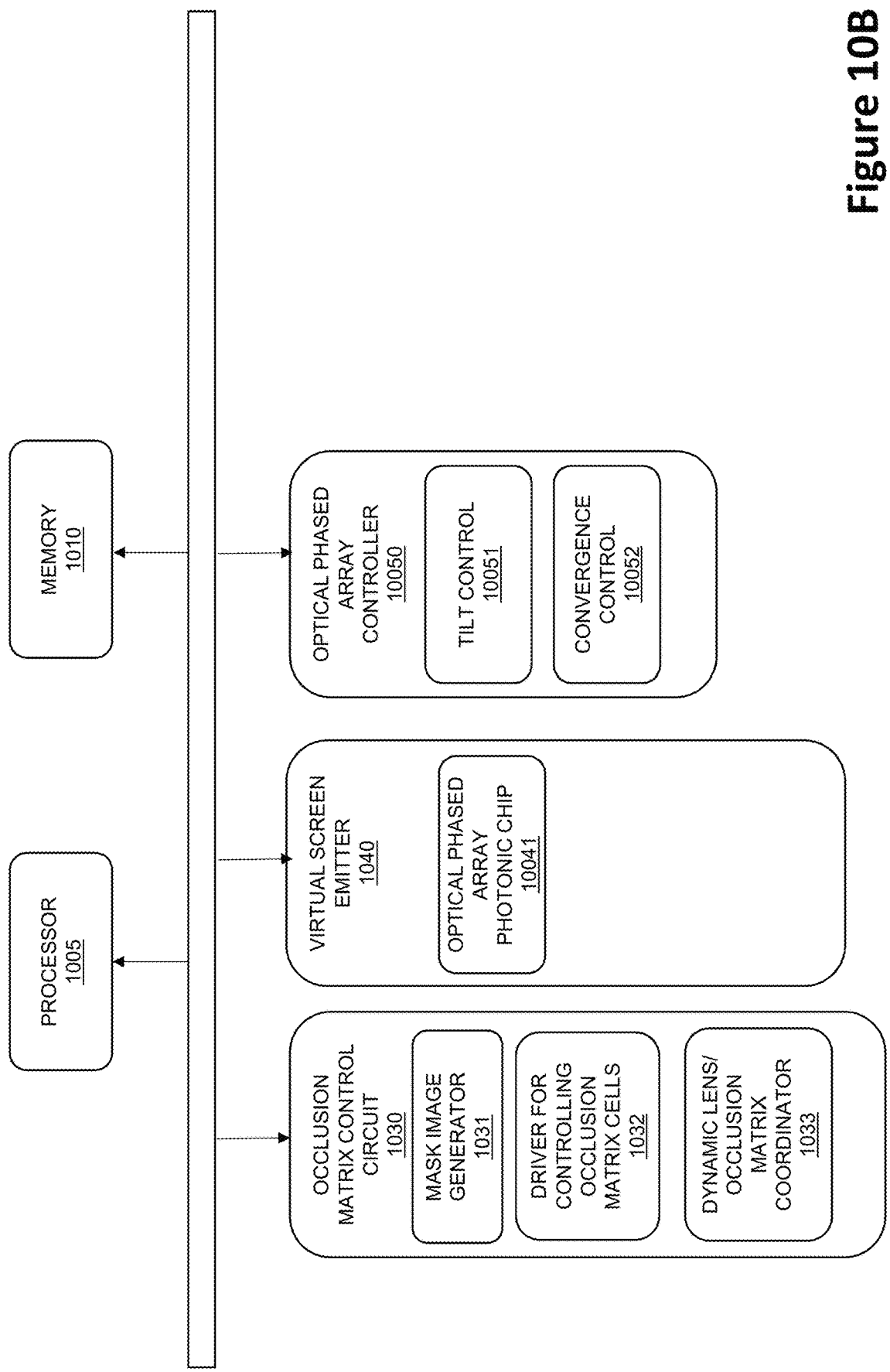
FIG. 10B is a block diagram depicting the system architecture of the optic system controller in the context of an alternate embodiment of either a smart contact lens or an intraocular device comprising an optical phased array.

FIG. 10A depicts an alternative embodiment which uses an optical phased array in lieu of a liquid lens. In said embodiment the virtual screen emitter 1040 may comprise an optical phased array photonic chip 10041. Said embodiment may also comprise an optical phased array controller 10050. Similar to the liquid lens embodiment, the optical phased array controller may also comprise tilt control 10051 and convergence control modules 10052. Said control modules may allow the system to essentially place the virtual image of the virtual monitor at an arbitrary position in space, provided the target position is compatible with the optical thresholds of the optical phase array photonic chip.

Figure 11:
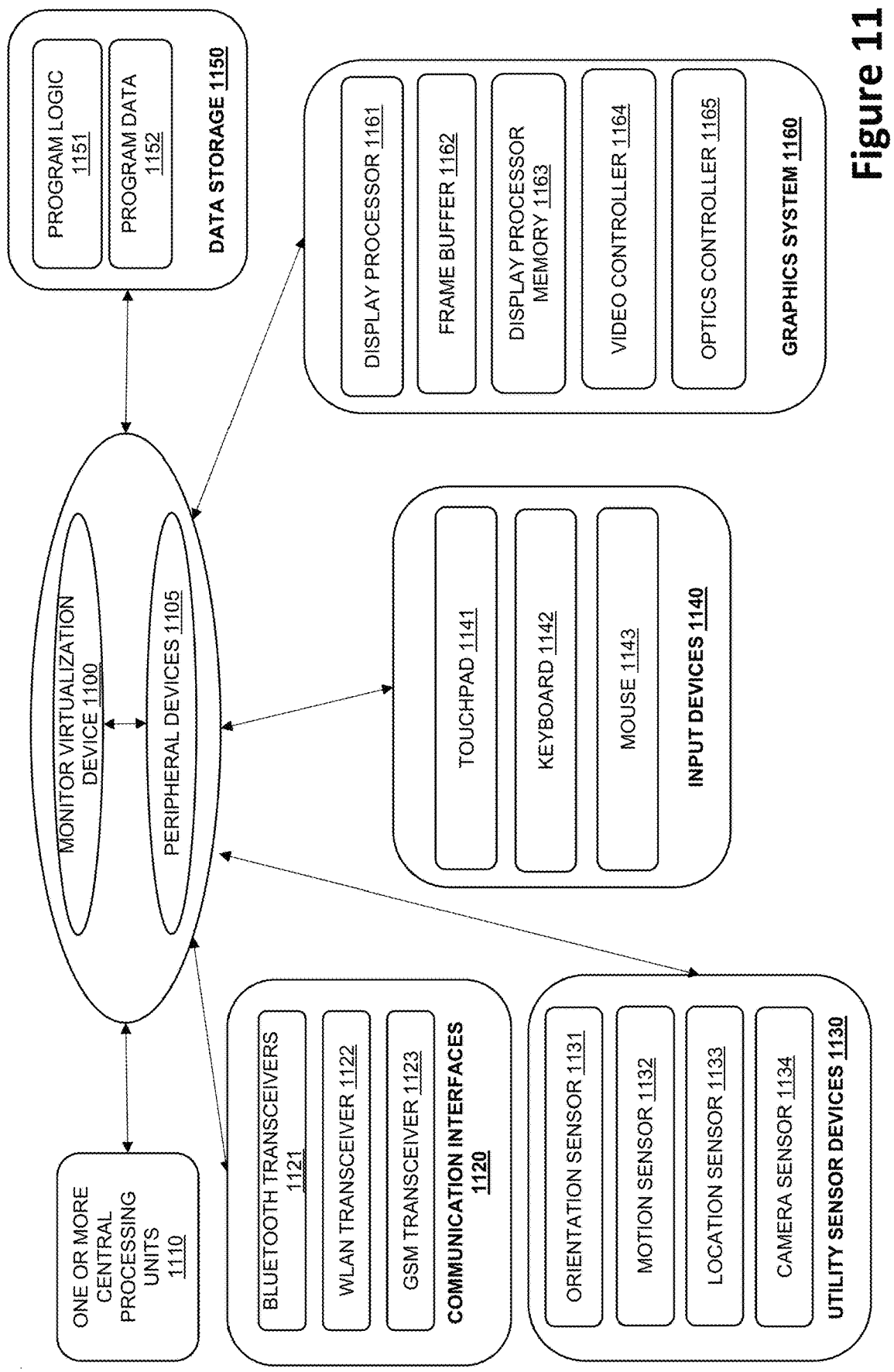
FIG. 11 is a block diagram depicting the overall system architecture of an exemplary embodiment in accordance with the principles of the present invention.

FIG. 11 depicts an overall system diagram of a preferred embodiment of the present invention. The system may combine a monitor virtualization device 1100, for example a head-mountable device, a smart contact lens or an intraocular implant, with a plurality of add-on peripheral devices 1105 which may take the shape of a notebook-type device, a traditional desktop PC, a touchpad, a smartphone, or any other type of similar device and combination thereof. The system components described in this section may be housed either within the monitor virtualization device itself, or inside of or attached to any of the connected add-on devices. The overall system may comprise one or more processing units 1110 which can either constitute a shared resource, or especially if performance-critical tasks are performed, separate processors can be added to the singular components. The preferred embodiment further may comprise a plurality of communication interfaces 1120, which in turn may comprise a plurality of transceivers, wherein said transceivers may perform the function of enabling wireless connections between the components themselves and with the wider world, such as to access cloud services. The plurality of transceivers in the preferred embodiment may comprise Bluetooth transceivers 1121, a wireless local area network transceiver 1122 and a GSM transceiver 1123, however those skilled in the art will appreciate that any combination of state of the art wireless transceivers will suffice for enabling an embodiment of the present invention. The preferred embodiment may further comprise a plurality of utility sensor devices 1130. These devices may comprise an orientation sensor 1131 which is tasked with keeping track of changes in orientation of the head mountable device, a motion sensor 1132 which is tasked with keeping track of any movements of the user wearing the head mountable device and a location sensor 1133 which is tasked with being able to detect any changes of the user's geolocation, such as when entering or leaving an office. The preferred embodiment of the present invention may further comprise a plurality of input devices 1140. The input devices in turn may comprise a touchpad 1141, a keyboard 1142 and a mouse 1143. Those skilled in the art will appreciate that any other combination of suitable input devices will satisfy the requirements demanded by the invention. The preferred embodiment may further comprise a graphics system 1160, which, in turn, may comprise a display processor 1161, a frame buffer 1162, display processor memory 1163, a video controller 1164 and an optics controller 1165. With the exception of the optics controller 1165, the depicted graphics components are similar to those found in a standard desktop personal computer. The makeup of the optics controller 1165 itself has been previously introduced with FIG. 10. The preferred embodiment of the present invention further comprises data storage 1150. Data storage is primarily used to store both program logic 1151 and program data 1152.

Figure 12:
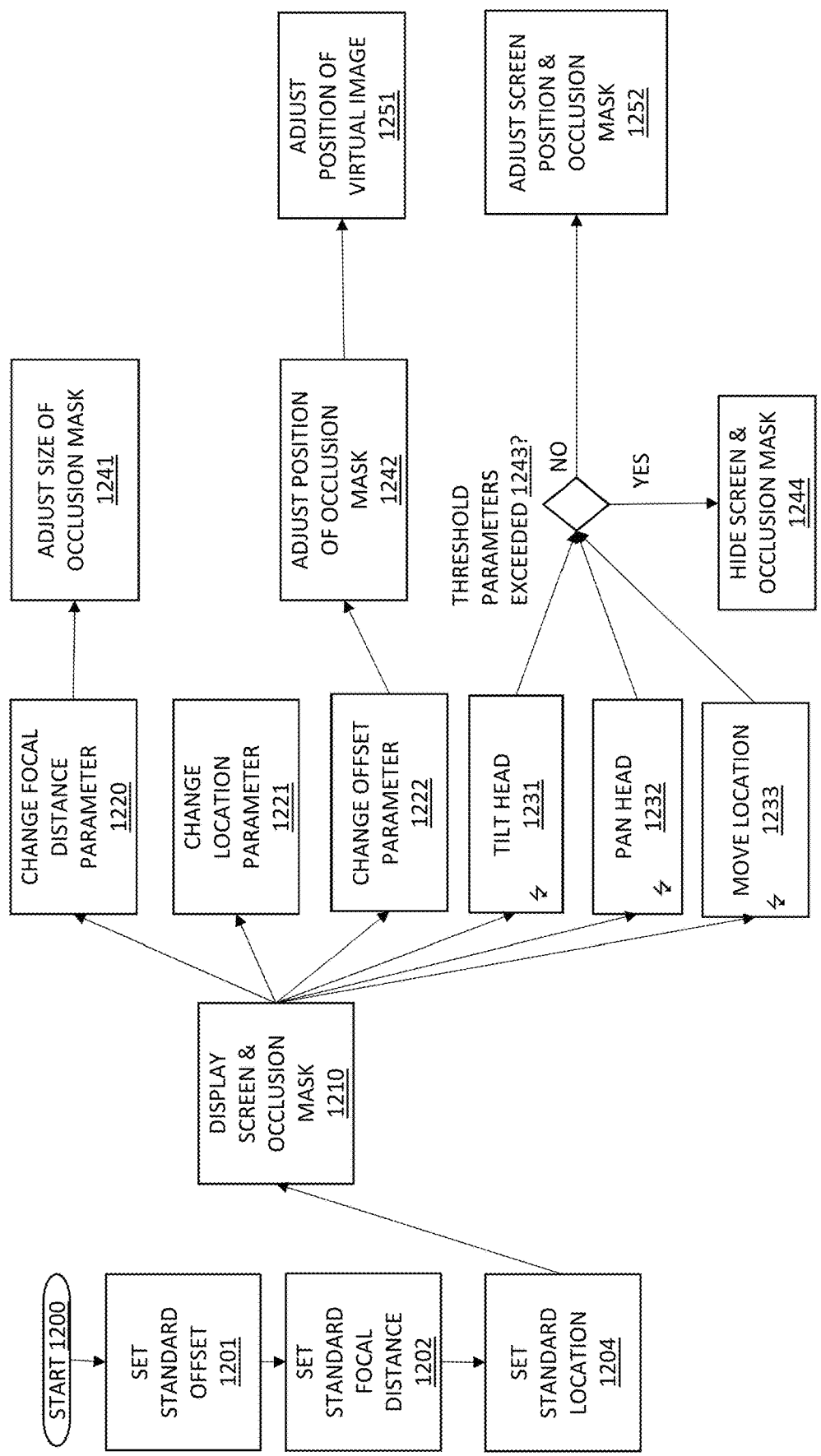
FIG. 12 is a flow chart depicting the control flow, events and operations of a preferred embodiment in accordance with the principles of the present invention.

FIG. 12 depicts a flow chart relating to the operation of a preferred embodiment of the invention. At the start 1200 of the sequence the user is able to set a standard offset 1201, signifying the relative position of the virtual screen in the field of view. The offset may be specified in terms of XY coordinates. The user may also be able to set the standard focal distance 1202 which defines how far away, in terms of radial distance, from the user the virtual screen is placed. Furthermore, a standard location 1204 may be defined by the user. With the standard location, the user may define in which locations the virtual screen should be displayed. For example, the user could define that they only wish the virtual screen to appear automatically when sitting at their desk either in the workplace or at home. At all other locations, the screen would have to be enabled manually. As the next step in the flow chart the display screen and the occlusion mask are shown 1210. This implies that the virtual monitor is now visible to the user. Whilst the virtual monitor is being displayed, the user may be free to re-adjust various parameters comprising changing the focal distance parameter 1220, changing the location parameter 1221 and changing the offset parameter 1222. In response to a change of focal distance the size of the occlusion mask may also have to be adjusted 1241. Likewise, in response to a change of offset parameter 1222 the occlusion mask may have to be adjusted accordingly 1242 and, moreover, the position of the virtual image may also have to be adjusted 1251. Whilst the virtual monitor is being displayed a number of events may be detected by the system, namely a change in head tilt angle 1231, a change in pan angle of the head 1232 and a change of location 1233. An event handler 1243 may check as the next step if any threshold parameters have been exceeded. If at least one of them has been exceeded the virtual monitor may become hidden for as long as one of the parameters remains in excess of a threshold. If, however, no threshold is breached the virtual monitor may remain visible. It may, however, become necessary to adjust the relative position of the virtual screen in response to a user movement. If, for example, the user moves backwards, away from the virtual screen, then the focal distance of the virtual image ought to be increased by an amount equal to the user movement. If, on the other hand, the user only changes the attitude of their head then the image of the virtual monitor ought to be repositioned accordingly so that the user remains under the illusion that the virtual screen is anchored to the real-world environment, such as sitting on a desk. There are, however, more simplistic alternative embodiments of the present invention, wherein no adjustment of the virtual screen is made in response to user movements. In such embodiments, the screen may always be at the same preset focal distance and XY-offset and may be manually switched on and off.

Figure 13:
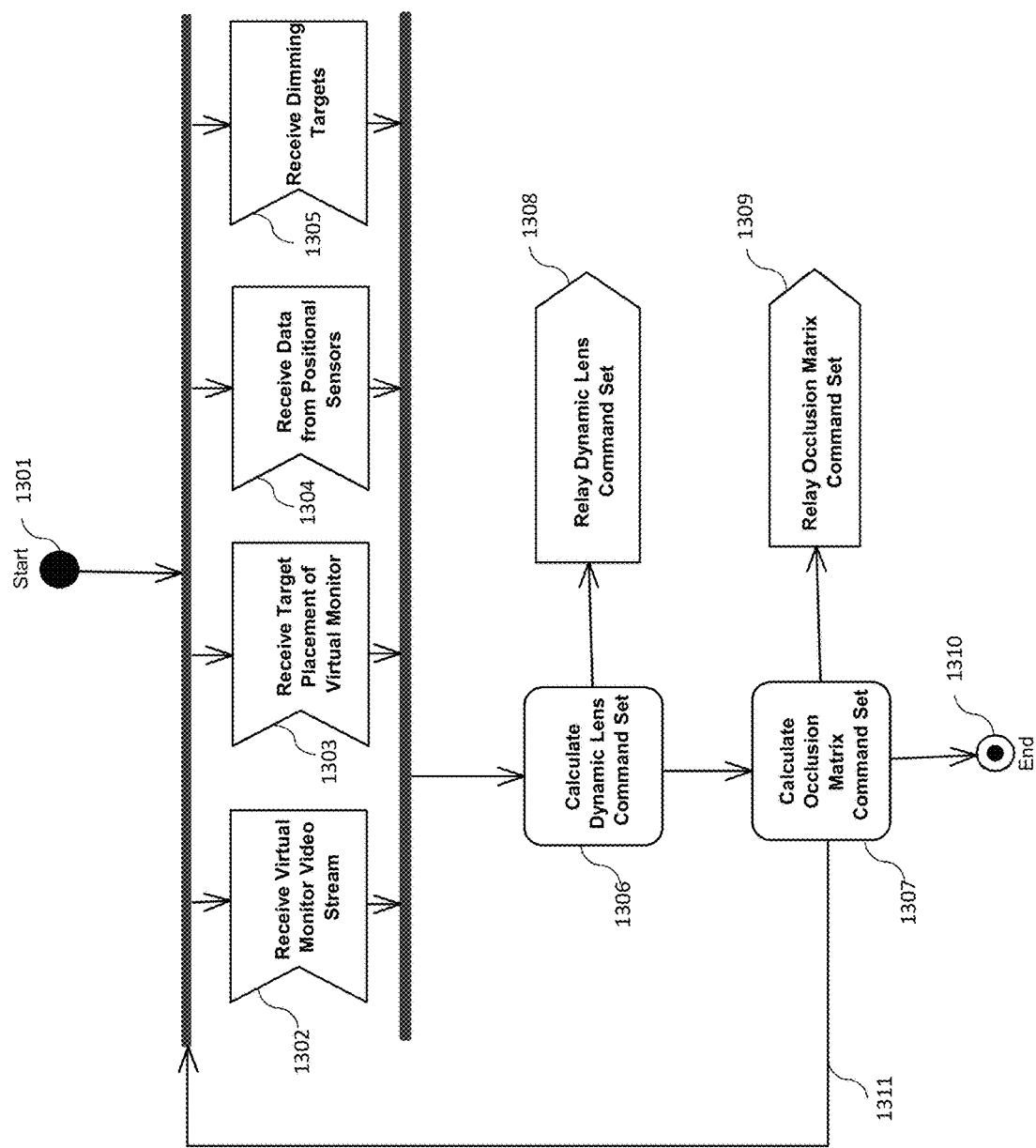
FIG. 13 illustrates an exemplary process flowchart for synchronizing occlusion matrix rendering with dynamic lens controlling.

FIG. 13 depicts an activity diagram which illustrates the interaction between the occlusion matrix controller and the dynamic lens controller. The dynamic lens can be a liquid lens or an optical phased array, for example. After the start event 1301 a processor may receive a virtual monitor video stream 1302. Said video stream can be both two-dimensional and three-dimensional. The video stream may also come in the form of a light field or any other format. The processor may also receive a target placement for the virtual monitor 1303. Said target placement may be absolute or relative. For example, the virtual monitor may be placed at certain distance and offset in relation to the frame of the head mountable device. The virtual monitor may also be anchored to a real-world location, such as a particular office desk. The virtual monitor may also be anchored to a real-world object, such as a monitorless notebook computer for example. The processor may also receive data from positional sensors 1304. Such data may, for example, come from a bokode detector configured to detect virtual screen anchor points on a real-world object. The data may also come from geolocation sensors, orientation sensors, motion sensors or camera sensors, for example. In a general sense, it is sensor data which potentially enables a processor to determine the position and orientation of the head mountable device in the real world and additionally where in relation to the head mountable device to virtual monitor ought to be placed according to the target relayed by step 1303. Optionally, the processor may also receive dimming targets 1305. Dimming targets are employed whenever it is desirable to the occlusion mask is not rendered fully opaque and thus purposely retains a certain degree of transparency. Dimming targets may also be used when it is desirable that the area of the occlusion matrix which is not part of an occlusion mask is dimmed for the purposes of contrast enhancement. This is a feature which is especially advantageous in conditions of strong ambient lighting where it would be desirable to render the occlusion mask fully opaque and to also dim the non-occluding pixels to such a degree that usability of the virtual screen is optimized. After having received the data from steps 1302, 1303, 1304 and, optionally, 1305, a command set for the dynamic lens is calculated in step 1306. The command set may comprise instructions for the dynamic lens controller regarding the placement and size of the virtual monitor, in particular accommodation distance and whichever angular offsets are desired. Once the command set has been calculated it may be immediately relayed to the dynamic lens controller in step 1308. It is particularly advantageous to compute the occlusion matrix command set in a step 1307 which is subsequent to the dynamic lens step 1306. The reason for this is because the dynamic lens is generally limited in terms of response times, angular deflection threshold and range of accommodation. In other words, it cannot always be assured that the target placement communicated through step 1303 can always be reached, because of physical limitations of the dynamic lens. The occlusion matrix controller, by nature is unaware of the physical limitations of the dynamic lens, since it is an essentially unrelated component. It is only the dynamic lens/occlusion matrix coordination circuit which applies the optical limitations of the dynamic lens to the circuit which renders the occlusion mask. Therefore, it is thus ensured that the occlusion mask is always compatible with the capabilities of the dynamic lens. So, if a particular target placement of the virtual monitor cannot be reached by the dynamic lens, even though theoretically it could be reached by the occlusion mask, then the occlusion mask may be placed at whichever point is compatible with the actual placement of the virtual monitor by the dynamic lens. Once the occlusion matrix command set has been successfully computed, it is then relayed to the occlusion matrix controller in step 1309. The process may then be indefinitely repeated by loop 1311, or ended 1310.

Figure 14:
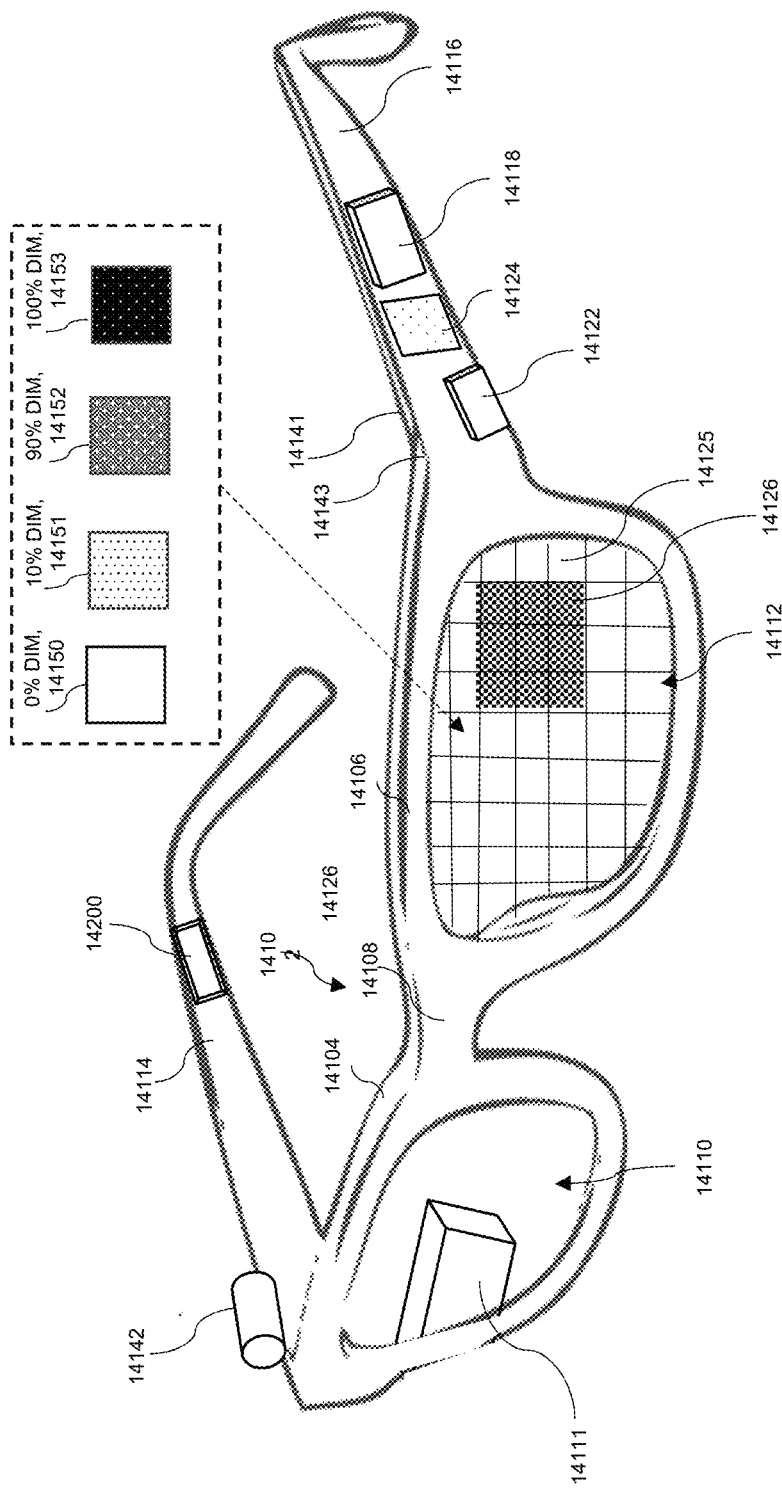
FIG. 14 illustrates a preferred embodiment of a head mountable device combining monitor virtualization capabilities with a smart sunglasses function.

FIG. 14 depicts an embodiment of the present invention whereby a virtual monitor may be projected by head mountable device 14102. The head mountable device may comprise two eyepieces, of which each one may comprise one occlusion matrix. The occlusion matrixes fulfill a dual purpose in the depicted embodiment. One the one hand the occlusion matrixes are utilized to render the virtual monitor images opaque. On the other hand, when the head mountable device is not displaying a virtual monitor, then the occlusion matrixes may optionally be configured to act as smart sunglass lenses. Smart sunglasses in this context include both sunglasses with dimmable lenses and sunglasses which allow dynamic control of polarization filtering properties. Smart sunglasses furthermore include sunglasses whereby the optical power of the lenses may be adjusted by electro-optical means.

In FIG. 14, the wearable computing system takes the form of a head-mountable device (head mountable device) 14102. It should be understood, however, that example systems and devices can take the form of or be implemented within or in association with other types of devices, without departing from the scope of the invention. As illustrated in FIG. 14, the head mountable device 14102 includes frame elements including lens-frames 14104, 14106 and a center frame support 14108, lens elements 14110, 14112, and extending side-arms 14114, 14116. In the figure, the structure of the lens elements is only depicted on lens element 14112; lens element 14110 exhibits the same structure as 14112, however it is depicted without structure in order to allow depicting the virtual monitor emitting assembly 14111, which is situated behind each of the lens elements. In some alternative embodiments only one single, monocular virtual monitor emitting assembly is used, even though both lens elements comprise occlusion matrixes. The center frame support 14108 and the extending side-arms 14114, 14116 may be configured to secure the head mountable device 14102 to a user's face via a user's nose and cars, respectively.

Each of the frame elements 14104, 14106, and 14108 and the extending side-arms 14114, 14116 can be formed of a solid structure of plastic and/or metal, or can be formed of a hollow structure of similar material so as to allow wiring and component interconnects to be internally routed through the head mountable device 14102. Other materials are possible as well. The lens elements 14110, 14112 can be formed of any material that can suitably incorporate an occlusion matrix such as specified previously. In an example embodiment of smart sunglasses with smart polarization filtering capabilities, the occlusion matrix may comprise a matrix of polarization filter stacks followed by a guest-host type anisotropic absorber, wherein the anisotropic absorber may be dynamic adjusted in terms of transmittance. In the specific example shown in FIG. 14, occlusion matrix element 14125 is differentiated from occlusion matrix element 14126 in terms of dimming. Element 14125 is momentarily set up for no dimming, i.e. it is as translucent as possible, whereas element 14126 is momentarily set up for 90 percent dimming, i.e. it is substantially opaque but still purposely exhibits a small degree of transparence. FIG. 14 depicts a preferred embodiment, wherein any one of the occlusion matrix elements can be dynamically set at runtime to one of four possible distinct dimming states: 0 percent dimming 14150, 10 percent dimming 14151, 90 percent dimming 14152 and 100 percent dimming 14153. Other dimming states are also possible. The extending side-arms 14114, 14116 can each be projections that extend away from the lens-frames 14104, 14106, respectively, and can be positioned behind a user's ears to secure the head mountable device 14102 to the user. The extending side-arms 14114, 14116 can further secure the head mountable device 14102 to the user by extending around a rear portion of the user's head. Additionally, or alternatively, for example, the head mountable device 14102 can connect to or be affixed within a head-mounted helmet structure. Other configurations for a head mountable device are also possible.

The head mountable device 14102 can also include an on-board computing system 14118, and a variety of optional utility devices, such as an image capture device or a finger-operable touch pad. The on-board computing system 14118 is shown to be positioned on the extending side-arm 14114 of the head mountable device 14102; however, the on-board computing system 14118 can be provided on other parts of the head mountable device 14102 or can be remotely positioned from the head mountable device 14102 (e.g. the on-board computing system 14118 could be connected by wire or wirelessly to the head mountable device 14102). The on-board computing system 14118 can include a processor and memory, for example. The on-board computing system 14118 can be configured to receive and analyze data from the said utility sensors and generate images for output by an optional augmented reality (AR) display device. In the context of the virtual monitor embodiment, it is the on-board computing system 14118 which is configured to execute the functionality of the dynamic lens controller module, the occlusion matrix controller module and the dynamic lens/occlusion matrix coordinator module. In order to be able to execute this functionality the on-board computing system 14118 is interconnected to the virtual monitor emitting assembly 14111. The virtual monitor emitting assembly 14111 may comprise the hardware components depicted in either FIG. 7 or FIG. 7A, i.e. the required electro-optical components which are depicted in the respective figures, with the exception of the software components, which are hosted by the on-board computing system 14118 and also with the exception of the occlusion matrix. The on-board computing system may be further configured to be able to receive a video stream for display on the virtual monitor. The video stream may either be stored on a computer-readable medium, which is either attached to or integrated with the head-mountable device. Alternatively, the on-board computing system may be configured to receive a video stream wirelessly, such as via Bluetooth, GSM, WLAN or the like. Said video stream may also be generated by the on-board computing system itself. The on-board computing system 14118 may be further interconnected to the plurality of occlusion matrixes 14110 and 14112. The instant example embodiment also comprises a bokode detector 14142 which may also be interconnected to the on-board computing system 14118. The depicted example shows a bokode detector which is realized as an out-of-focus digital camera. It is generally possible to combine the bokode detector with a general-purpose utility camera, so the camera can be alternatively switched from bokode detection mode (out-of-focus) to photograph capture mode (in-focus). The bokode detector may be realized as either as lensless camera, realized through an optical phased array, for example, or a lens-equipped digital camera. The bokode detector may also be combined with a plenoptic light-field camera. The bokode detector may also be combined with the plurality of polarization-variant image capture devices which are required for the intelligent polarization filtering embodiments of smart sunglasses.

An exemplary utility sensor 14122 is shown on the extending side-arm 14116 of the head mountable device 14102; however, sensor 14122 can be positioned on other parts of the head mountable device 14102. For illustrative purposes, only one sensor 14122 is shown. However, in an example embodiment, the head mountable device 14102 can include any number of additional utility sensors.

An optional finger-operable touch pad 14124 is shown on the extending side-arm 14114 of the head mountable device 14102. However, the finger-operable touch pad 14124 can be positioned on other parts of the head mountable device 14102. Also, more than one finger-operable touch pad can be present on the head mountable device 14102. The finger-operable touch pad 14124 can be used by a user to input commands. If more than one finger-operable touch pad is present, each finger-operable touch pad can be operated independently, and can provide a different function. In a further aspect, head mountable device 14102 can be configured to receive user input in various ways, in addition or in the alternative to user input received via finger-operable touch pad 14124. For example, on-board computing system 14118 can implement a speech-to-text process and utilize a syntax that maps certain spoken commands to certain actions. In addition, head mountable device 14102 can include one or more microphones via which a wearer's speech can be captured. Configured as such, head mountable device 14102 can be operable to detect spoken commands and carry out various computing functions that correspond to the spoken commands. The head mountable device 14102 can also be configured with user-facing cameras in order for the on-board computing system to be able to detect facial gestures which can be subsequently interpreted as input parameters for commands. User-facing cameras can also be used to lip-read speech, for speech recognition in noisy environments. Lip-reading may either be used in isolation, i.e. without a microphone, in order to transcribe the lip movements into text or commands; or it may be used in combination with a microphone in order to enhance the accuracy of speech recognition. In this configuration, the on-board computing system may use both language modelling derived from corpora of text and lip-movement modelling derived from statistical models of lip movements transcribed to phonemes in order to enhance the quality of speech recognition, which amongst other uses, is utilized for the user to issue commands which are relevant to the configuration and operation of the virtual monitor.

As another example, head mountable device 14102 can interpret certain hand or facial gestures as user input. As a further example, head mountable device 14102 can interpret eye movement as user input. The head mountable device 14102 also may comprise a contact bone conducting transducer 14200 which may be connected to the on-board computing system 14118. The on-board computing system may be configured to relay output from the contact bone-conducting transducer to an external computing system, wherein said output may be either raw or pre-processed. In a preferred embodiment, the transducer output may be relayed via a Bluetooth wireless connection to a smartphone. The contact bone-conducting transducer is mounted, in the depicted example, on the inside of the folding side arm 14114 in a position which allows contact with the skin above the ear bone. In a proof of concept embodiment, a Fishman SBT-C transducer, which is 10 mm in diameter and 1 mm in thickness was used, which allows detecting audio frequencies in the range from 2 to 52 kHz.

Figure 15:
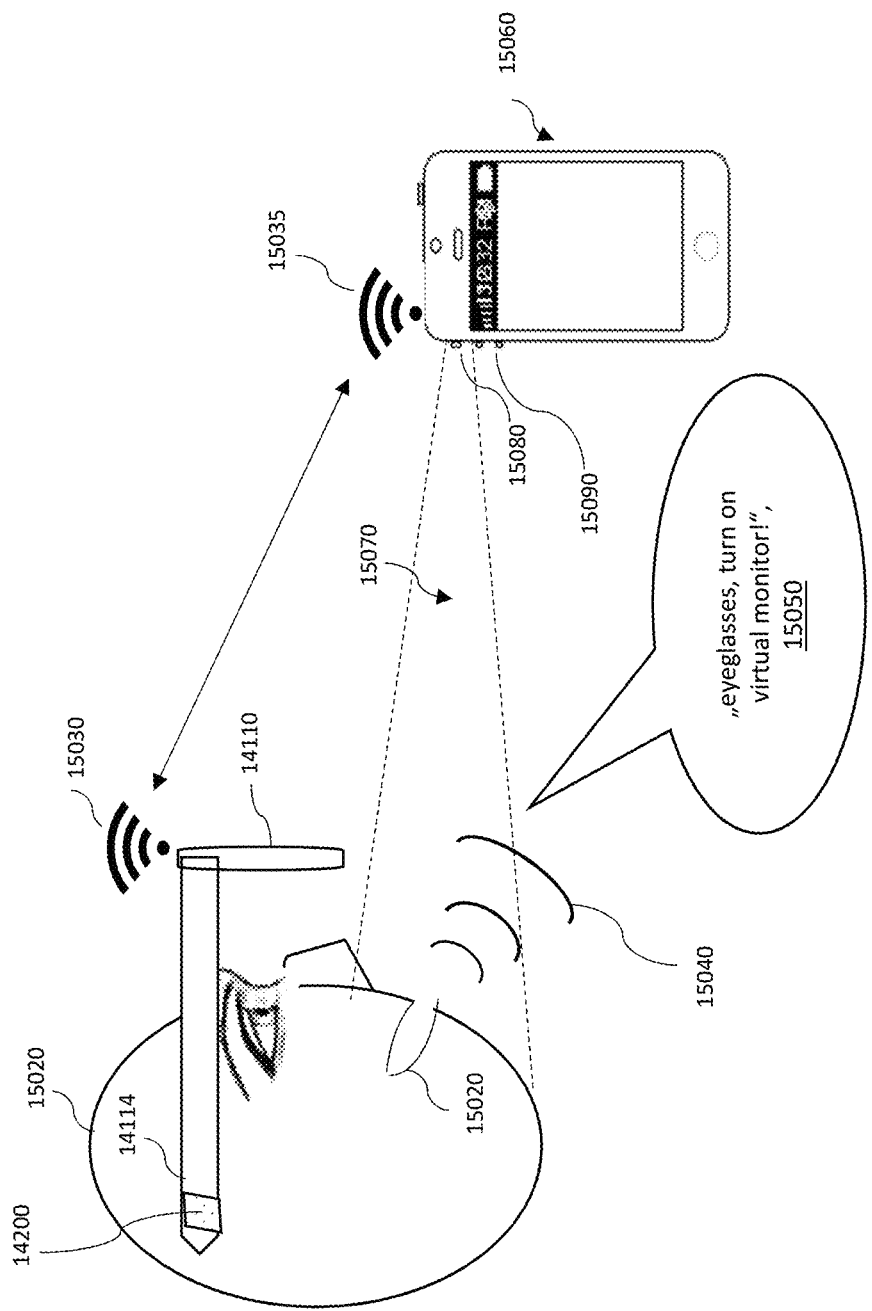
FIG. 15 illustrates a preferred embodiment of a head mountable device combining monitor virtualization capabilities with a voice-driven controller which may use contact bone conducting transducers for improved phoneme detection.

FIG. 15 depicts an example embodiment of an inventive departure regarding the processing of speech commands for head mountable devices which are used in conjunction with an interconnected handheld computing device, such as a smartphone. In the prior art, there are systems which carry out speech recognition with traditional air conducting (AC) microphones providing the input. It is possible to improve the results of AC speech recognition by additionally employing speechreading or lip-reading techniques. In this way the user's face, in particular the region around the mouth, may be captured by a video camera and the resulting video stream may be subsequently analyzed by a processor running a speechreading algorithm. The output of such speechreading algorithms can be sequences of phonemes, which is also an output produced by traditional AC-type speech recognition. By combining the detected sequences of phonemes it is possible to considerably improve speech recognition results, especially in noisy environments. In very noisy environments however, even such a combination may not be sufficient to produce good results. As an inventive departure, the present inventor has hence added a third independent phoneme detection circuit in order to improve the results of voice command detection in noisy environments. The present inventor has realized that contact bone-conducting transducers allow consistently good phoneme detection results especially in cross-talk environments, i.e. the cocktail party effect. In such environments, traditional air conducting microphones tend to simultaneously pick up phonemes from a variety of speakers and it is hence very difficult to differentiate which phonemes were uttered by the user of the device. Speechreading techniques can help in mapping detected phonemes to the device user, but current state of the art speechreading systems only are a little over 50 percent accurate in demanding environments, such when the user is mobile and is using the built-in smartphone camera for speechreading video capture. When using contact bone-conducting (BC) phoneme detection, in a setting where the transducers are attached to the side arms of a head mountable device, then the phoneme detection rate may be similarly poor as the phoneme detection rate achieved by speechreading. The present inventor has made the discovery, however, that both the speechreading approach and the bone conducting approach to phoneme detection can usefully complement each other when used in combination. The reason for that is that speechreading algorithms find it very difficult to differentiate between phonemes where the lip movements are largely similar, even though the corresponding sound is markedly different. Conversely, bone conducting algorithms have difficulties, whenever there is little sound difference between phonemes, even though the lip movements may be significantly different. Hence when both approaches are used in combination, the present inventor has found that phoneme detection rates are surprisingly high.

In the example embodiment shown in FIG. 15 a user 15020 is wearing head-mountable device 14102. Bone-conducting transducer 14200 may be pressed to an area of skin above the user's ears by folding side arm 14114. The user is shown to be uttering a voice command 15050. A user-facing video camera 15080 on the user's handheld smartphone 15060 may be used to capture a video segment 15070 comprising the mouth area 15020 of the user's face. The air-conducting sound 15040 associated with the user's utterance 15050 may be captured by an in-built microphone of smartphone 15060. The smartphone 15060 and the head mountable device 14102 may be wirelessly interconnected, for example by Bluetooth. The head mountable device may be configured to accept command input from apps which are hosted on the smartphone. For voice command input a command detection and interpretation module may be run by the smartphone processor. Said module may receive a stream of bone-conducting transducer output from the head mountable device by a wireless link. Furthermore, said module may receive video stream 15070 from the smartphone's inbuilt camera 15080 and also air conducting audio from microphone 15090.

Figure 16:
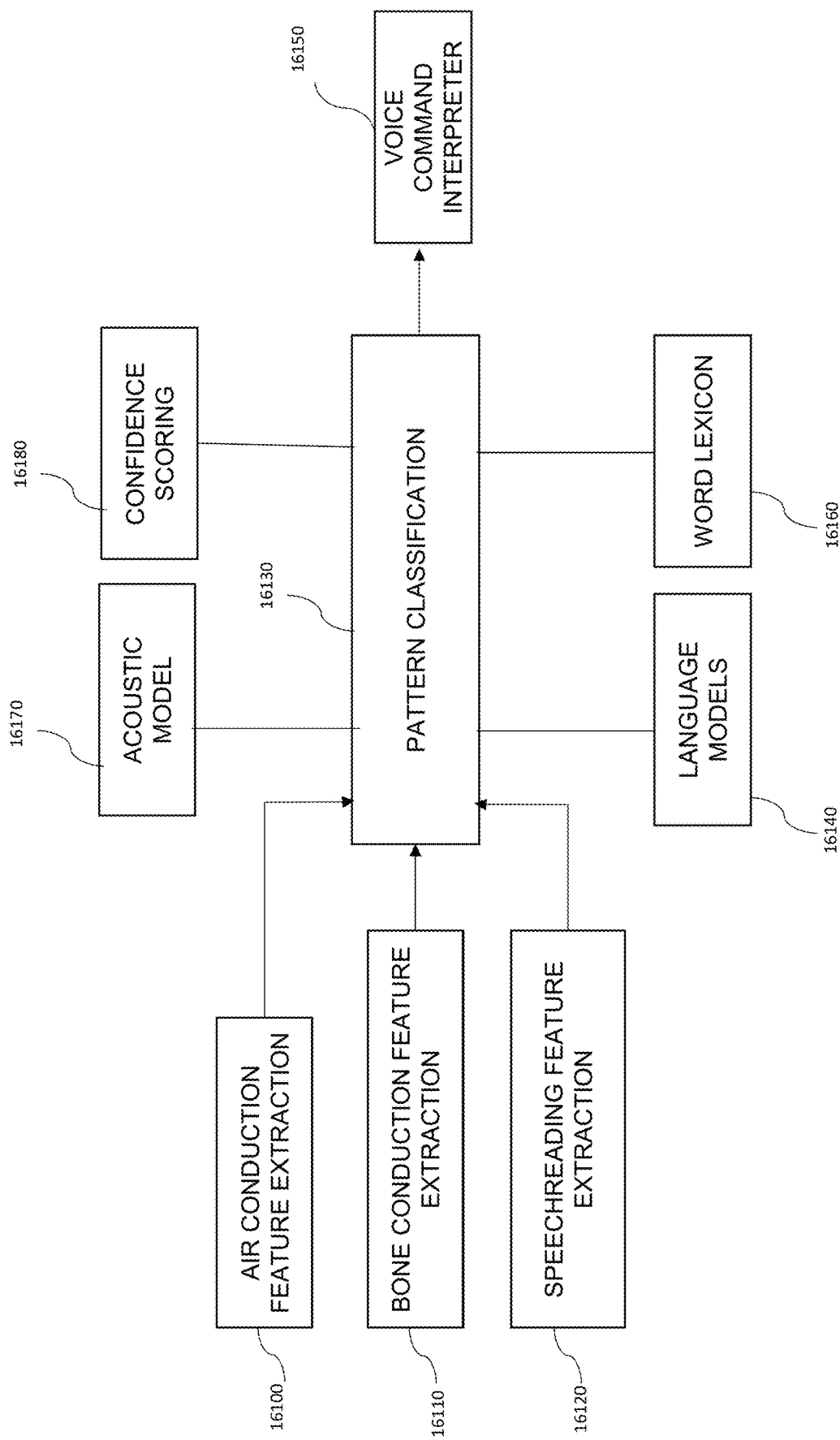
FIG. 16 illustrates an exemplary class diagram of the components relating to the voice command controller which comprises a bone conduction feature extraction module.

FIG. 16 depicts the subsequent processing of the speech parameters gained from the sensors which have been described in connection with FIG. 15. In the example embodiment, all sensor readings which are not directly gained from smartphone sensors may be wirelessly relayed from the head mountable device to the smartphone where all speech-related sensor readings may subsequently be analyzed in combination. Thus, the output from the air conducting microphone 15090 may be subsequently channeled into the air conducting feature extraction module 15100, the output from the contact bone-conducting transducer 14200 may be relayed from the head mountable device to the smartphone and subsequently channeled into the contact bone conduction feature extraction module 16110 and the video output from camera 15080 may be channeled into the speechreading phoneme feature extraction module 16120. The three said feature extraction modules may analyze the respective input streams and may extract features which are meaningful for the follow-up step of phoneme detection which is one of the analysis steps that may be performed in the pattern classification module 16130.

The pattern classification module 16130 may use the acoustic model 16170 to extract phonemes on the basis of the features extracted from the combination of air conduction feature extraction 16100, bone conduction feature extraction 16110 and speechreading feature extraction 16120. The detected sequences of phonemes may subsequently be combined into words assisted by a word lexicon 16160 and into sequences of words assisted by a plurality of language models 16140. A confidence scoring step 16180 selects the statistically most meaningful results from a plurality of alternatives. The output of the pattern classification step may be a plurality of words, which may subsequently be relayed to the voice command interpreter module 16150. The voice command interpreter may map the input string to commands which are understood by the on-board computing system of the head mountable device. Said commands may be relayed by a wireless link, such as Bluetooth for example, to the head mountable device, where they may be subsequently executed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the wink gesture based control system, suitable methods and materials are described above. All publications, patent applications, patents, and other references mentioned herein are incorporated by reference in their entirety to the extent allowed by applicable law and regulations. The virtual monitor display technique for augmented reality environments may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A head-mountable apparatus, comprising:
an occlusion matrix comprising a plurality of actively addressed dimmable pixels, wherein said pixels are transmissive to light and wherein said pixels are capable of being seamlessly dimmed across a range of at least 20 percent of luminous transmission;
a virtual screen emitter, wherein said emitter is configured to project a virtual image into a field of view of a user of said apparatus;
and an occlusion matrix controller, wherein said controller is adapted for setting a first dimming level for one or more of said pixels on a line of sight by said user to said virtual image and for setting a second dimming level for one or more of said pixels not on a line of sight by said user to said image, and wherein the first dimming level is of a higher magnitude than the second dimming level.

2. The head-mounted apparatus of claim 1, wherein said controller comprises a user-selectable mode wherein a first subset of said pixels on a line of sight by said user to said image are set to the most opaque dimming level which is attainable by said pixels and wherein a second subset of said pixels not on a line of sight by said user to said image are set to the most transparent dimming level which is attainable by said pixels.

3. The head-mounted apparatus of claim 1, wherein said controller comprises a user-selectable mode wherein a first subset of said pixels on a line of sight by said user to said image is set to a minimally transparent dimming level and wherein a second subset of said pixels not on a line of sight to said image is set to the most transparent dimming level which is attainable by said pixels, and wherein said minimally transparent dimming level is defined as being transparent but letting through no more than 10 percent of light from the real word.

4. The head-mounted apparatus of claim 1, wherein said controller comprises a user-selectable mode wherein a first subset of said pixels on a line of sight by said user to said image is set to the most opaque dimming level which is attainable by said pixels and wherein a second subset of said pixels not on a line of sight by said user to said image is set to a dimming level which is letting through between 5 percent to 50 percent of light from the real world.

5. The head-mounted apparatus of claim 1, wherein said controller comprises a user-selectable mode wherein a first subset of said pixels on a line of sight by said user to said image are set to a minimally transparent dimming level and wherein a second subset of said pixels not on a line of sight by said user to said image are set to a dimming level which is letting through between 5 percent to 50 percent of light from the real world, and wherein said minimally transparent setting is defined as being transparent but letting through no more than 10 percent of light from the real word.

6. The head-mounted apparatus of claim 1, wherein said pixels comprise:
a layer of a liquid crystal;
a polarizer arranged on the user side of the liquid crystal layer; and
a polarizer arranged on the world side of the liquid crystal layer;
wherein said liquid crystal layer comprises birefringent liquid crystal molecules and wherein said liquid crystal layer is configured for dynamically setting an intermediate transmittance level between a fully open state and a fully closed state of said layer, and wherein said setting is effected by applying a voltage amplitude modulation to a voltage applied to said layer.

7. The head-mounted apparatus of claim 1, wherein said controller is configured in such a way that said dimming of pixels is a step function of a rotation of a head of said user.

8. The head-mounted apparatus of claim 1, wherein said controller is configured in such a way that said dimming of pixels is a step function of a tilt of a head of said user.

9. The head-mounted apparatus of claim 1, further comprising a user location tracking circuit wherein said controller is configured in such a way that said dimming of pixels is a function of a location of said user.

10. The head-mounted apparatus of claim 9, wherein said function is a step function.

11. The head-mounted apparatus of claim 1, further comprising a user location tracking circuit wherein said controller is configured in such a way that said projecting of a virtual image is a step function of a location of said user.

12. The head-mounted apparatus of claim 1, further comprising a camera for capturing image data and a processor where said processor is configured for detecting at least two anchor points in said image data and wherein said dimming of pixels is a function comprising said anchor points and wherein said anchor points are for anchoring said virtual image relative to the real world.

* * * * *